US012599978B2

(12) United States Patent
Didier

(10) Patent No.: US 12,599,978 B2
(45) Date of Patent: Apr. 14, 2026

(54) RECIPROCATING TOOL

(71) Applicant: MILWAUKEE ELECTRIC TOOL CORPORATION, Brookfield, WI (US)

(72) Inventor: Christopher M. Didier, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 16 days.

(21) Appl. No.: 18/591,260

(22) Filed: Feb. 29, 2024

(65) Prior Publication Data

US 2024/0293881 A1 Sep. 5, 2024

Related U.S. Application Data

(60) Provisional application No. 63/593,603, filed on Oct. 27, 2023, provisional application No. 63/487,669, filed on Mar. 1, 2023.

(51) Int. Cl.
| | |
|---|---|
| *B23D 51/00* | (2006.01) |
| *B23D 49/16* | (2006.01) |
| *B23D 51/16* | (2006.01) |
| B23D 49/11 | (2006.01) |

(52) U.S. Cl.
CPC ........... *B23D 51/16* (2013.01); *B23D 49/162* (2013.01); *B23D 49/11* (2013.01)

(58) Field of Classification Search
CPC ....... B23D 49/11; B23D 49/162; B23D 51/16
See application file for complete search history.

(56) References Cited

U.S. PATENT DOCUMENTS

| | | | |
|---|---|---|---|
| 2,970,484 A | 2/1961 | Springer | |
| 3,863,342 A | 2/1975 | Griffies et al. | |
| 3,942,251 A | 3/1976 | Griffies et al. | |
| 3,971,132 A | 7/1976 | Griffies et al. | |
| 5,212,887 A | 5/1993 | Farmerie | |
| 6,568,089 B1 * | 5/2003 | Popik ..................... | B23D 51/16 |
| | | | 30/DIG. 1 |
| 6,725,548 B1 | 4/2004 | Kramer et al. | |
| 6,810,589 B2 | 11/2004 | Lagaly et al. | |
| 7,191,847 B2 | 3/2007 | Haas | |

(Continued)

FOREIGN PATENT DOCUMENTS

| | | |
|---|---|---|
| EP | 0124198 A1 | 11/1984 |
| WO | 2015155912 A1 | 10/2015 |

*Primary Examiner* — Eyamindae C Jallow
(74) *Attorney, Agent, or Firm* — Michael Best & Friedrich LLP

(57) ABSTRACT

A power tool includes: a housing having a handle configured to be grasped by a user; a motor supported by the housing and defining a motor axis; a driving gear rotated by the motor about the motor axis; a driven gear defining a rotation axis that is parallel to the motor axis, the driven gear engaging the driving gear to be rotated by the driving gear about the rotation axis; a crankshaft coupled to and rotatable with the driven gear; a counterweight having a first yoke coupled to the driven gear to translate rotation of the driven gear into reciprocating motion of the counterweight; and a spindle having a second yoke coupled to the crankshaft to translate rotation of the driven gear into reciprocating motion of the spindle, wherein the counterweight and the spindle reciprocate opposite one another.

23 Claims, 32 Drawing Sheets

(56)  References Cited

U.S. PATENT DOCUMENTS

| | | | |
|---|---|---|---|
| 7,246,533 B2 | 7/2007 | Lagaly et al. | |
| 7,363,713 B2 * | 4/2008 | Hirabayashi | B23D 51/16 |
| | | | 30/392 |
| 7,996,996 B2 | 8/2011 | Hirabayashi | |
| 8,141,257 B2 | 3/2012 | Haas | |
| 8,141,444 B2 * | 3/2012 | Lagaly | B23D 51/02 |
| | | | 74/44 |
| 8,371,032 B2 | 2/2013 | Hirabayashi | |
| 9,962,779 B2 | 5/2018 | Haas | |
| 10,259,060 B2 | 4/2019 | Sugino et al. | |
| 10,603,728 B2 | 3/2020 | Gall | |
| 10,828,707 B2 | 11/2020 | Wang | |
| 10,850,338 B2 | 12/2020 | Zheng | |
| 10,960,474 B2 * | 3/2021 | Wang | B25D 17/24 |
| 11,453,093 B2 * | 9/2022 | Baskar | F16H 21/18 |
| 2004/0117993 A1 | 6/2004 | Armstrong | |
| 2004/0255475 A1 * | 12/2004 | Hirabayashi | B23D 51/16 |
| | | | 30/392 |
| 2008/0010840 A1 | 1/2008 | Lagaly et al. | |
| 2011/0226500 A1 * | 9/2011 | Furusawa | B25D 17/24 |
| | | | 173/110 |
| 2012/0192440 A1 | 8/2012 | Jerabek et al. | |
| 2020/0070265 A1 * | 3/2020 | Wang | B25D 17/24 |
| 2020/0222996 A1 | 7/2020 | Cholst et al. | |
| 2020/0398393 A1 * | 12/2020 | Baskar | F16H 21/36 |
| 2021/0394288 A1 * | 12/2021 | Fukinuki | B23D 49/16 |

* cited by examiner

112

116,120

512

532

524

116

528

504

358

72

754

920

762

924

916

754

816

908

816a

816b

908

824

906

822

820

808

816

816b

RECIPROCATING TOOL

CROSS-REFERENCE TO RELATED APPLICATIONS

This application claims priority to U.S. Provisional Patent Application No. 63/593,603 filed on Oct. 27, 2023, and to U.S. Provisional Patent Application No. 63/487,669 filed on Mar. 1, 2023, the entire contents of each of which are incorporated herein by reference.

BACKGROUND

The present application relates to a power tool. In particular, the present application relates to a reciprocating tool. Reciprocating tools are used to cut a variety of objects made from a variety of materials, such as metal pipes, wood and dry wall. A cordless, compact reciprocating tool allows for cutting operations in tight spaces or awkward angles for plumbing, electrical, remodeling and HVAC applications.

SUMMARY

In one embodiment, a power tool includes a housing having a handle configured to be grasped by a user, a motor supported by the housing and defining a motor axis, a driving gear rotated by the motor about the motor axis, and a driven gear defining a rotation axis that is parallel to the motor axis. The driven gear engages the driving gear to be rotated by the driving gear about the rotation axis. A crankshaft is coupled to and rotatable with the driven gear. A counterweight has a first yoke coupled to the driven gear to translate rotation of the driven gear into reciprocating motion of the counterweight. A spindle has a second yoke coupled to the crankshaft to translate rotation of the driven gear into reciprocating motion of the spindle. The counterweight and the spindle reciprocate parallel to and opposite one another.

In another embodiment, a power tool includes a housing having a handle configured to be grasped by a user and a motor supported by the housing. A drive assembly includes a driving gear rotated by the motor, a driven gear engages the driving gear to be rotated by the driving gear about the rotation axis, a crankshaft is coupled to and rotatable with the driven gear, and a spindle has a yoke coupled to the crankshaft to translate rotation of the driven gear into reciprocating motion of the spindle. A gear case is supported by the housing and configured to support the motor and the drive assembly. The gear case includes a first end, a second end opposite the first end, and an elastic member positioned at the second end. A shoe assembly is coupled to and axially movable relative to the gear case. The shoe assembly is configured to abut the clastic member to absorb shock due to axial vibrations during operation.

In another embodiment, a power tool includes a housing having a handle configured to be grasped by a user, a motor supported by the housing and defining a motor axis, a driving gear rotated by the motor about the motor axis, and a driven gear defining a rotation axis that is parallel to the motor axis. The driven gear engages the driving gear to be rotated by the driving gear about the rotation axis. A crankshaft is coupled to and rotatable with the driven gear. A counterweight has a first yoke coupled to the driven gear to translate rotation of the driven gear into reciprocating motion of the counterweight, the counterweight being disposed on a rail in the housing. A spindle has a second yoke coupled to the crankshaft to translate rotation of the driven gear into reciprocating motion of the spindle. The counterweight is slidable along the rail within the housing.

In another embodiment, a power tool includes: a housing having a handle configured to be grasped by a user; a motor supported by the housing and defining a motor axis; a driving gear rotated by the motor about the motor axis; a driven gear defining a rotation axis that is parallel to the motor axis, the driven gear engaging the driving gear to be rotated by the driving gear about the rotation axis; a crankshaft coupled to and rotatable with the driven gear; a counterweight having a first yoke coupled to the driven gear to translate rotation of the driven gear into reciprocating motion of the counterweight; and a spindle having a second yoke coupled to the crankshaft to translate rotation of the driven gear into reciprocating motion of the spindle, wherein the counterweight and the spindle reciprocate opposite one another.

In another embodiment, a power tool includes: a housing having a handle configured to be grasped by a user; a motor supported by the housing; a driving gear rotated by the motor; a driven gear defining a rotation axis, the driven gear engaging the driving gear to be rotated by the driving gear about the rotation axis; a crankshaft coupled to and rotatable with the driven gear; a counterweight having a first yoke coupled to the driven gear to translate rotation of the driven gear into reciprocating motion of the counterweight, the counterweight defining a center of gravity; and a spindle having a second yoke coupled to the crankshaft to translate rotation of the driven gear into reciprocating motion of the spindle, wherein counterweight and the spindle reciprocate opposite one another, and wherein the center of gravity of the counterweight is positioned within a height of the spindle.

In another embodiment, a power tool includes: a housing; a motor supported by the housing; a driving gear rotated by the motor; a driven gear defining a rotation axis and including an eccentric shaft, the driven gear engaging the driving gear to be rotated by the driving gear about the rotation axis; a bearing movably supported on the eccentric shaft; a crankshaft coupled to eccentric shaft and rotatable with the driven gear; a grease passage at least partially defined through the crankshaft; a counterweight having a first yoke, the eccentric shaft extending through the first yoke such that rotation of the driven gear causes reciprocating motion of the counterweight, the bearing being positioned between eccentric shaft and the first yoke; and a spindle having a second yoke coupled to the crankshaft to translate rotation of the driven gear into reciprocating motion of the spindle, wherein the counterweight and the spindle reciprocate opposite one another, and wherein reciprocation of the spindle causes grease to move through the grease passage to lubricate the bearing.

In another embodiment, a power tool includes: a housing having a handle configured to be grasped by a user; a motor supported by the housing; a drive assembly including a driving gear rotated by the motor, a driven gear engaging the driving gear to be rotated by the driving gear about a rotation axis, a crankshaft coupled to and rotatable with the driven gear, and a spindle having a yoke coupled to the crankshaft to translate rotation of the driven gear into reciprocating motion of the spindle; a gear case supported by the housing and configured to support the motor and the drive assembly, the gear case including a first end, a second end opposite the first end, and an elastic member positioned at the second end; and a shoe assembly coupled to and axially movable relative to the gear case, the shoe assembly configured to abut the elastic member to absorb shock due to axial vibrations during operation.

In another embodiment, a power tool includes: a housing having a handle configured to be grasped by a user; a motor supported by the housing and defining a motor axis; a driving gear rotated by the motor about the motor axis; a driven gear defining a rotation axis that is parallel to the motor axis, the driven gear engaging the driving gear to be rotated by the driving gear about the rotation axis; a crankshaft coupled to and rotatable with the driven gear; a counterweight having a first yoke coupled to the driven gear to translate rotation of the driven gear into reciprocating motion of the counterweight, the counterweight being disposed on a rail within the housing; and a spindle having a second yoke coupled to the crankshaft to translate rotation of the driven gear into reciprocating motion of the spindle, wherein the counterweight is slidable along the rail within the housing.

Other aspects of the invention will become apparent by consideration of the detailed description and accompanying drawings.

BRIEF DESCRIPTION

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
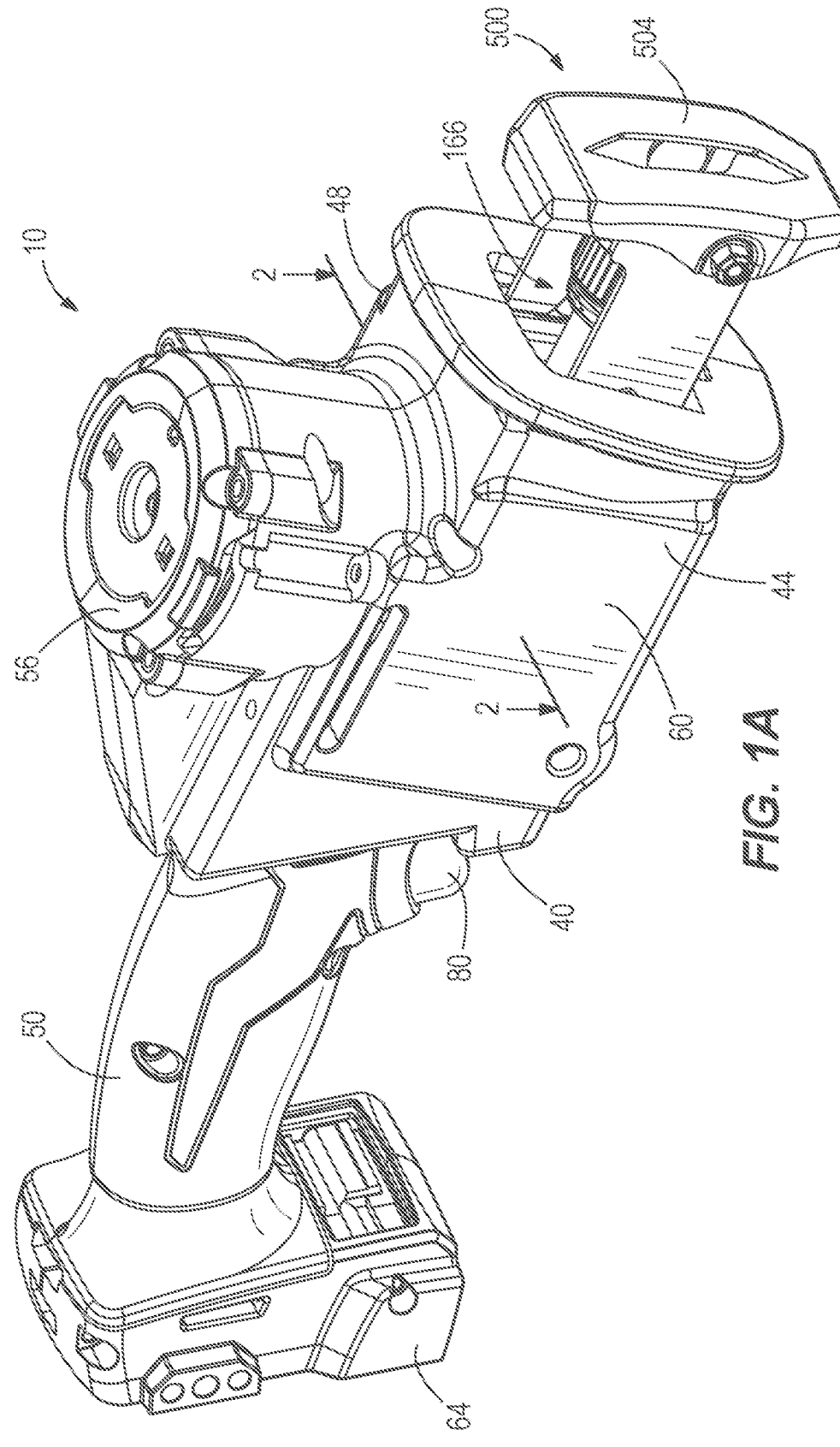
FIG. 1A is a perspective view of a reciprocating saw according to one embodiment of the invention.

A portable power tool 10 (e.g., a portable reciprocating tool) is shown in FIG. 1A. In these embodiments, the power tool 10 is a reciprocating saw. In the illustrated embodiment, the saw 10 is powered by a power tool battery pack (not shown). The battery pack may be configured to connect and power a variety of tools in addition to the reciprocating saw 10. In other embodiments, the saw 10 may be a corded power tool. In still other embodiments, the power tool may be another hand-held power tool, such as, for example, another type of power tool that translates rotary motion into reciprocating motion.

The saw 10 of FIG. 1A includes a housing 40. As shown in FIG. 1A, the housing 40 has a first housing portion 44 and a second housing portion 48. Each housing portion 44, 48 is formed of plastic; however, in some embodiments, the housing portions 44, 48 may be formed of other materials. The housing 40 defines a handle 50, a motor housing portion 56, and a gear case housing portion 60. The handle 50 includes at least one grip surface configured to be grasped by a user. In the illustrated embodiments, the handle 50 can also define a battery receiving portion 64 for receiving the battery pack. In other embodiments, the battery receiving portion 64 may be defined elsewhere within the housing 40. The motor housing portion 56 is coupled to an end of the handle 50 opposite from the battery receiving portion 64. The gear case housing portion 60 is also coupled to the end of the handle 50 opposite from the battery receiving portion 64. The gear case housing portion 60 is adjacent and below the motor housing portion 56 (as viewed in FIG. 1B). The motor housing portion 56 supports a motor 68, and the gear case housing portion 60 in turn supports a gear case 72 (FIGS. 3-9).

Although not shown in detail, the battery receiving portion 64 is configured as a cavity. When the battery pack (FIG. 1A) is connected to the saw 10, the pack is inserted into the cavity and substantially closes the cavity. As shown in FIGS. 1A-2, an actuator 80 is positioned on the handle 50 for powering the saw 10. In particular, the actuator 80 is electrically coupled to the battery pack and the motor 68 to selectively energize the motor 68 when actuated. As illustrated, the actuator 80 is an on/off trigger. In other embodiments, the actuator 80 may be a variable speed trigger, a two-speed trigger, a push button or another suitable actuator.

Figure 3:
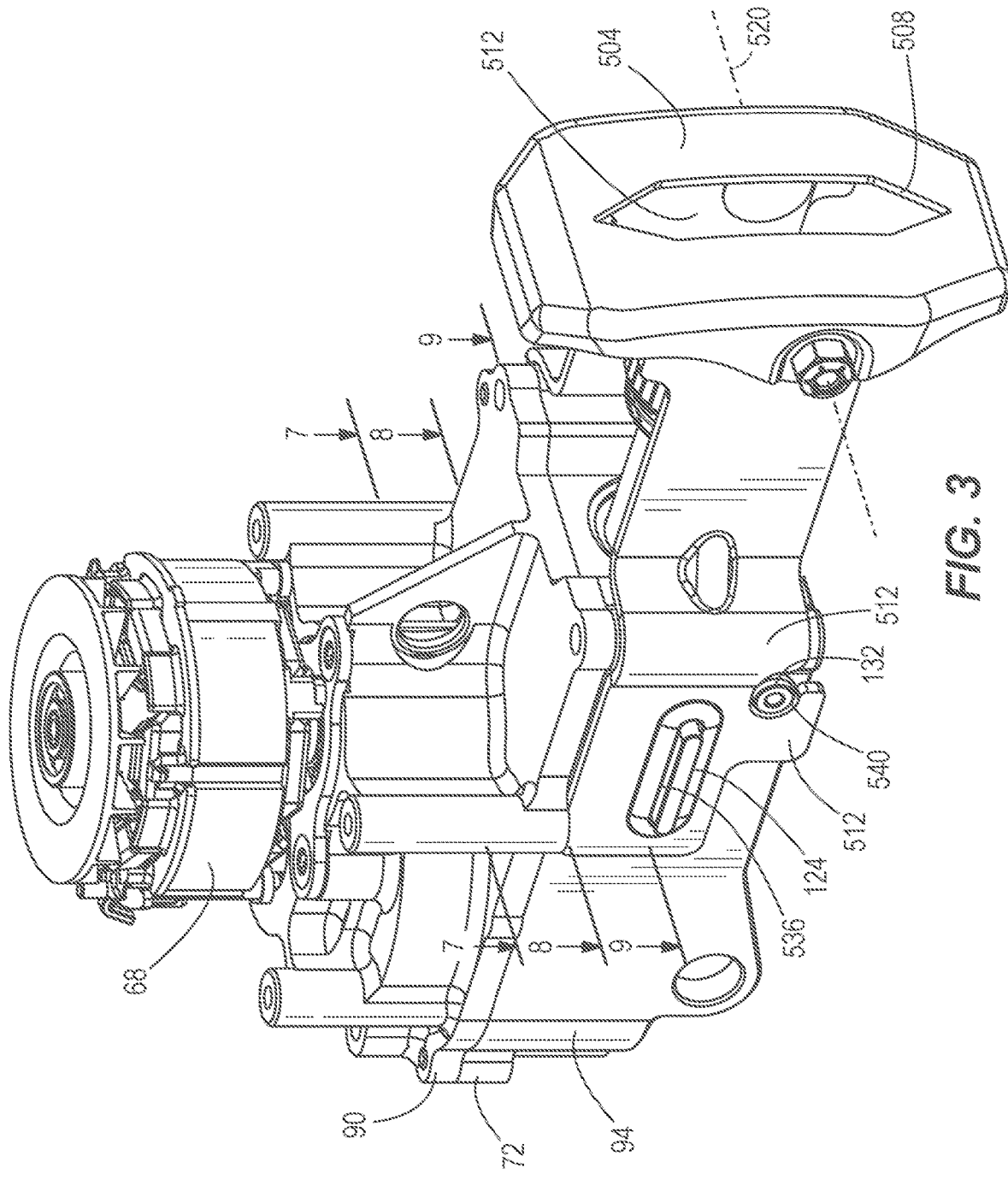
FIG. 3 is a perspective view of a motor, a gear case, a spindle assembly, and a shoe assembly of the reciprocating saw of FIG. 1A.
Figure 4:
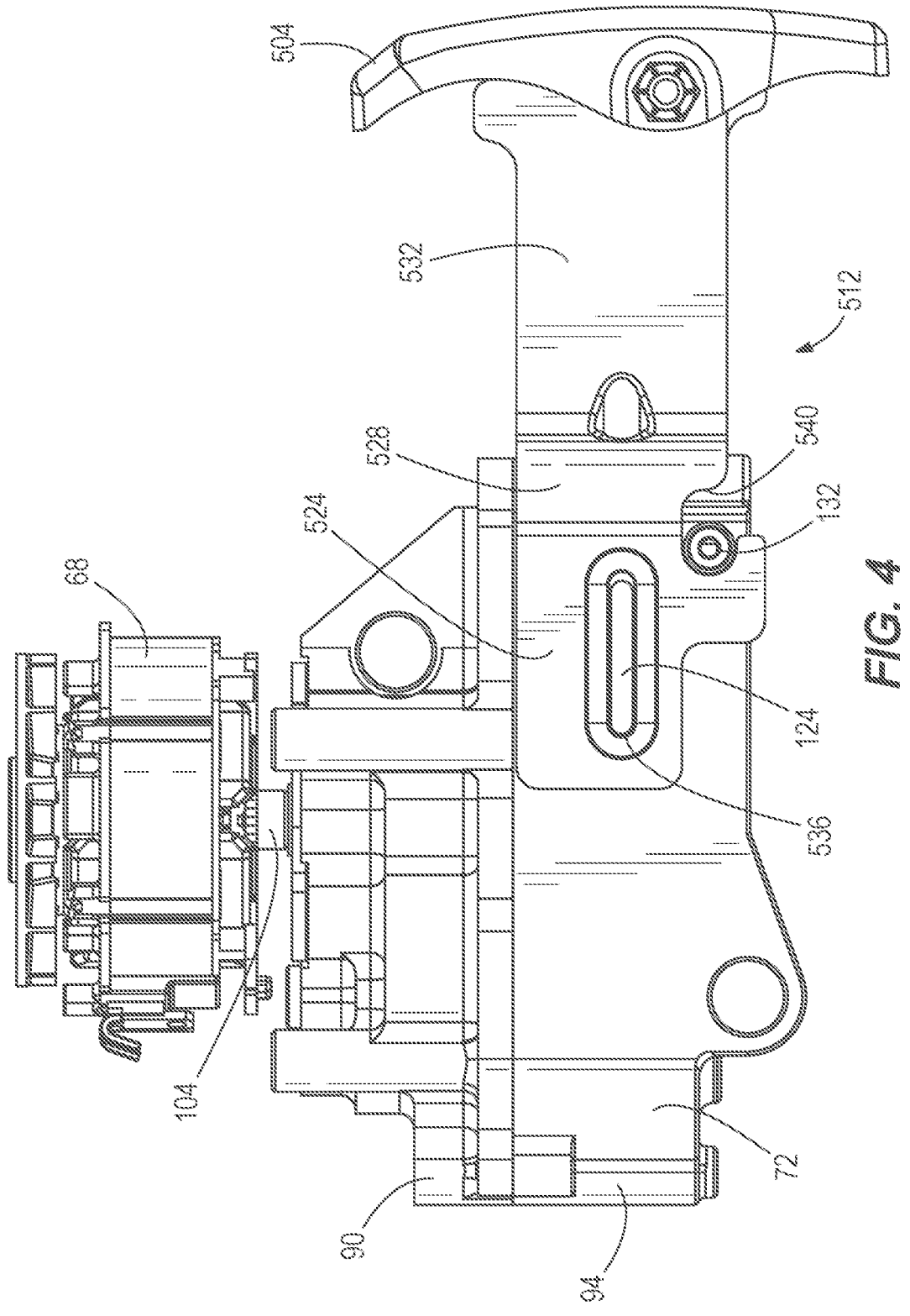
FIG. 4 is a side view of the motor, the gear case, the spindle assembly, and the shoe assembly of the reciprocating saw of FIG. 1A.
Figures 5, 6:
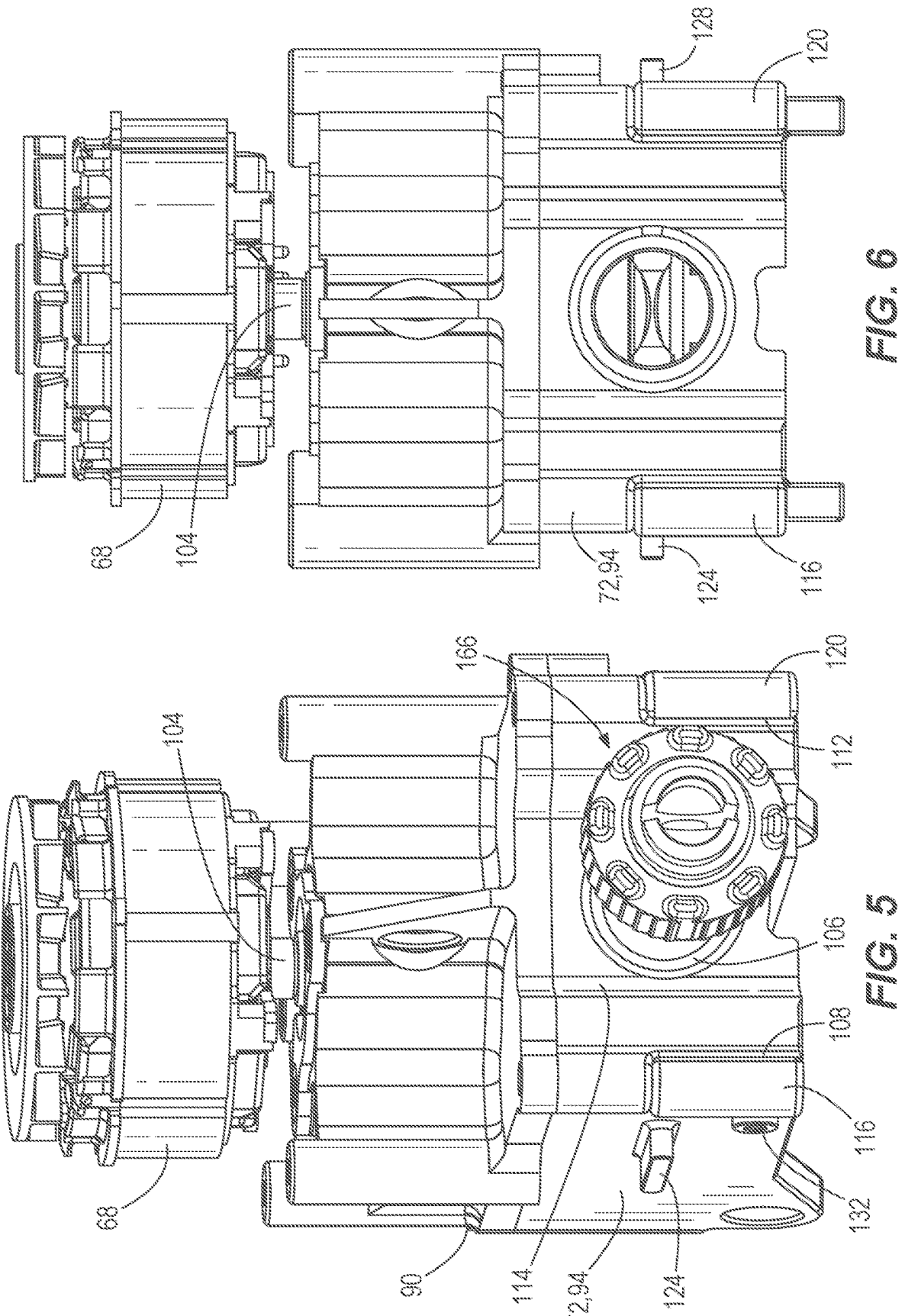
FIG. 5 is a perspective view of the motor, the gear case, an elastic member, and the spindle assembly of the reciprocating saw of FIG. 1A.
FIG. 6 is a front view of the motor, the gear case, and the elastic member of the reciprocating saw of FIG. 1A.
Figure 29:
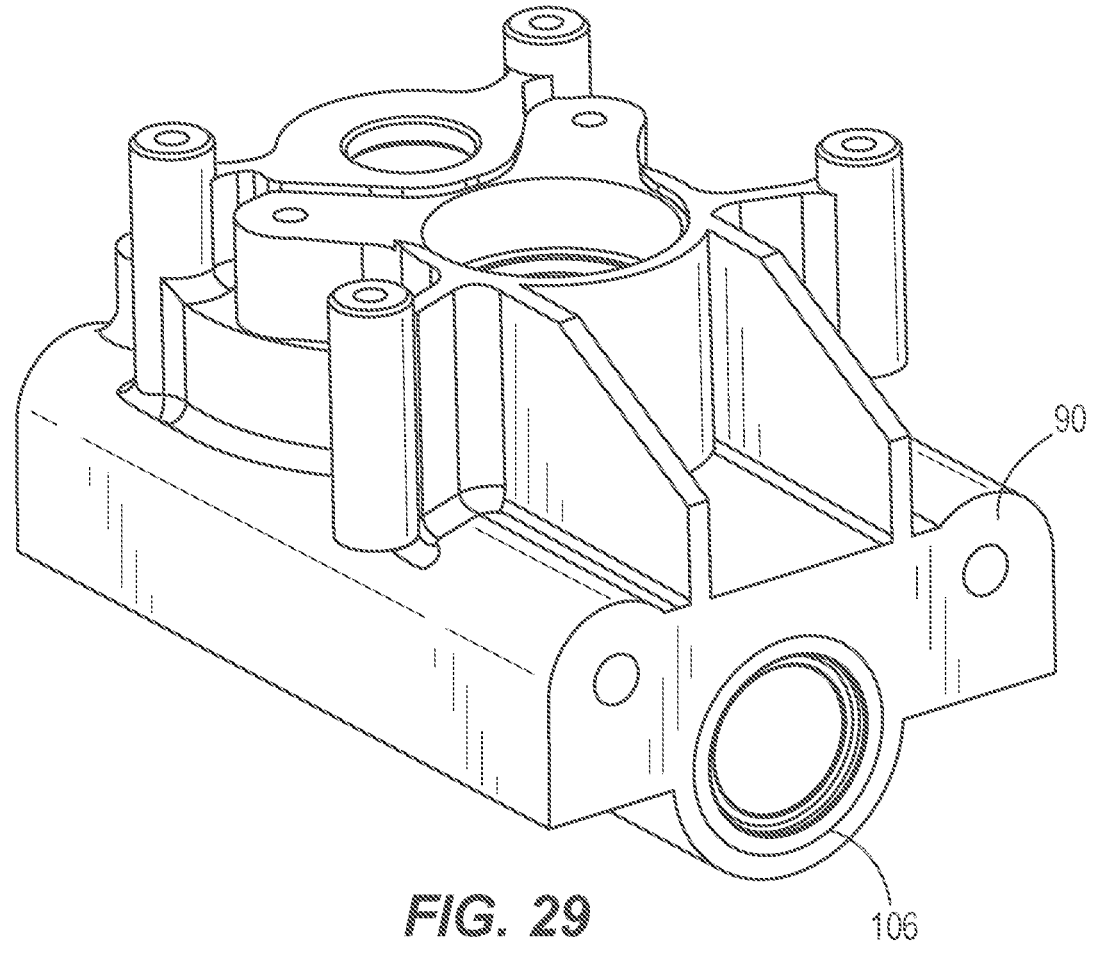
FIG. 29 illustrates a first gear case portion according to an embodiment of the invention.

Referring to FIGS. 3 and 4, the gear case 72 generally supports the motor 68 and a drive assembly 76. The gear case 72 includes a first gear case portion 90 and second gear case portion 94 that are coupled to one another and enclose the drive assembly 76 for the saw 10. As shown, the motor 68 is positioned above the gear case 72 (e.g., the first gear case portion 90) such that an output shaft 104 (FIG. 4) of the motor 68 extends into the gear case 72 through an opening in the first gear case portion 90. With respect to FIGS. 5 and 6 and 24-25, the second gear case portion 94 has an opening 106, a first recess 108, and a second recess 112. The opening 106 is in a forward wall 114 of the second gear case portion 94. The opening 106 is configured to receive portion of a spindle assembly 166, as will be discussed below. As shown in FIG. 29, in other embodiments the first gear case portion 90 defines the opening 106. In this embodiment, solely the first gear case portion 90 receives and supports the spindle assembly 166.

Figure 9:
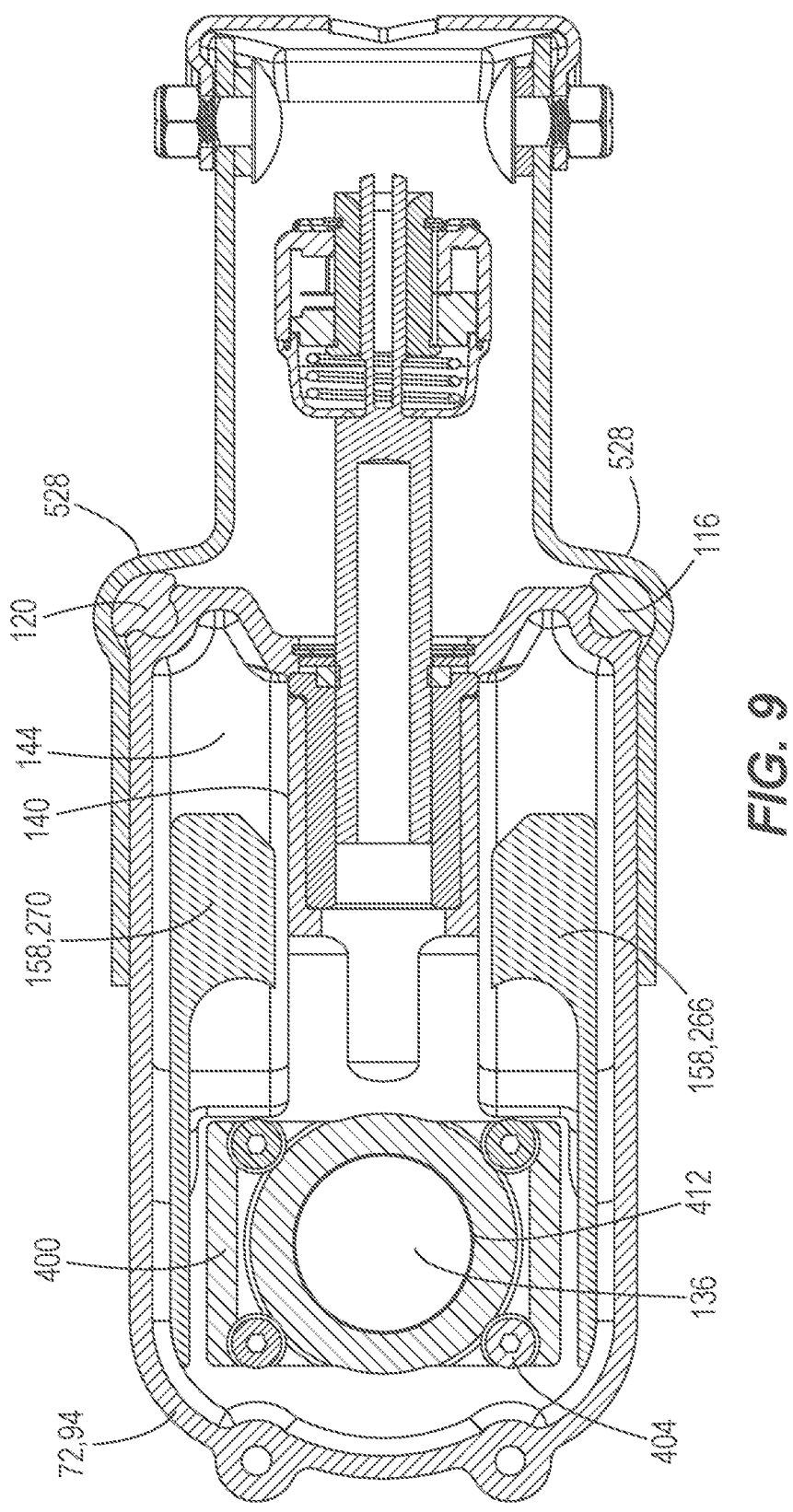
FIG. 9 is a cross-sectional view of a portion of the reciprocating saw taken along the line 9-9 of FIG. 3.

The first recess 108 receives a first elastic member 116 and the second recess 112 receives a second elastic member 120. As shown, the first and second recesses 108, 112 are positioned at the forward corners of the second gear case portion 94. Accordingly, each of the first and second elastic members 116, 120 received in the respective first and second recesses 108, 112 at least partially define a forward corner of the second gear case portion 94. A first elongated projection 124 extends from a first side surface of the second gear case portion 94, and a second elongated projection 128 extends from a second, opposite side surface of the second gear case portion 94. A first round projection 132 extends from the first side surface of the second gear case portion 94 and, a second round projection (not shown but identical to the first projection) extends from a second, opposite side surface of the second gear case portion 94. As shown in FIG. 9, the second gear case portion 94 further includes a projection 136 and a generally arcuate guide wall 140 extending from an inner bottom surface 144 thereof. Although the illustrated gear case 72 is described as having certain projections in particular areas, in other embodiments, the gear case 72 may include fewer or more projections, the projections may have other configurations (e.g., shapes), and/or the projections may be located elsewhere on the gear case 72.

Figure 10:
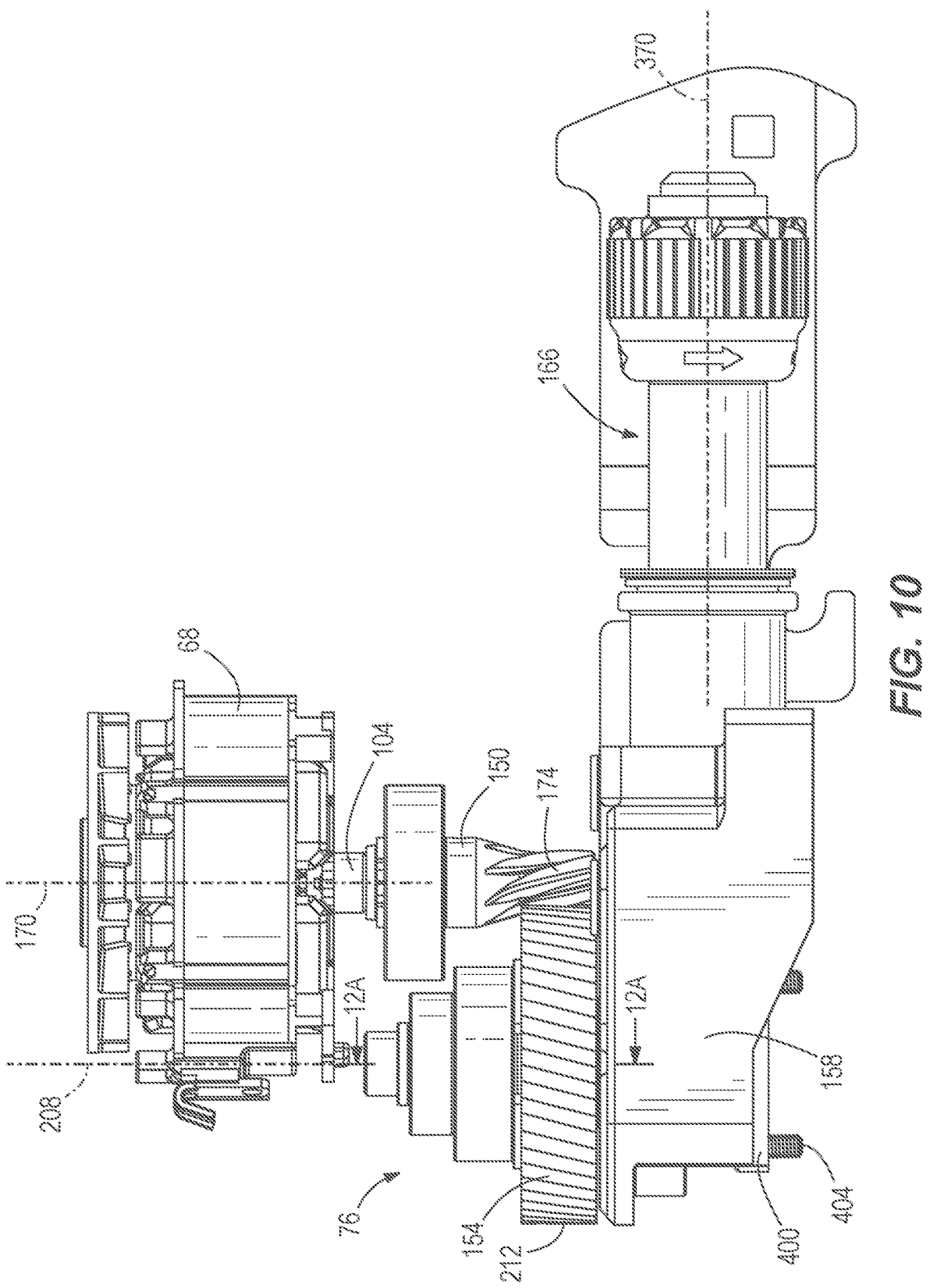
FIG. 10 is a side view of the motor, a transmission, a counterweight, and the spindle assembly of the reciprocating saw of FIG. 1A.
Figures 11, 12A:
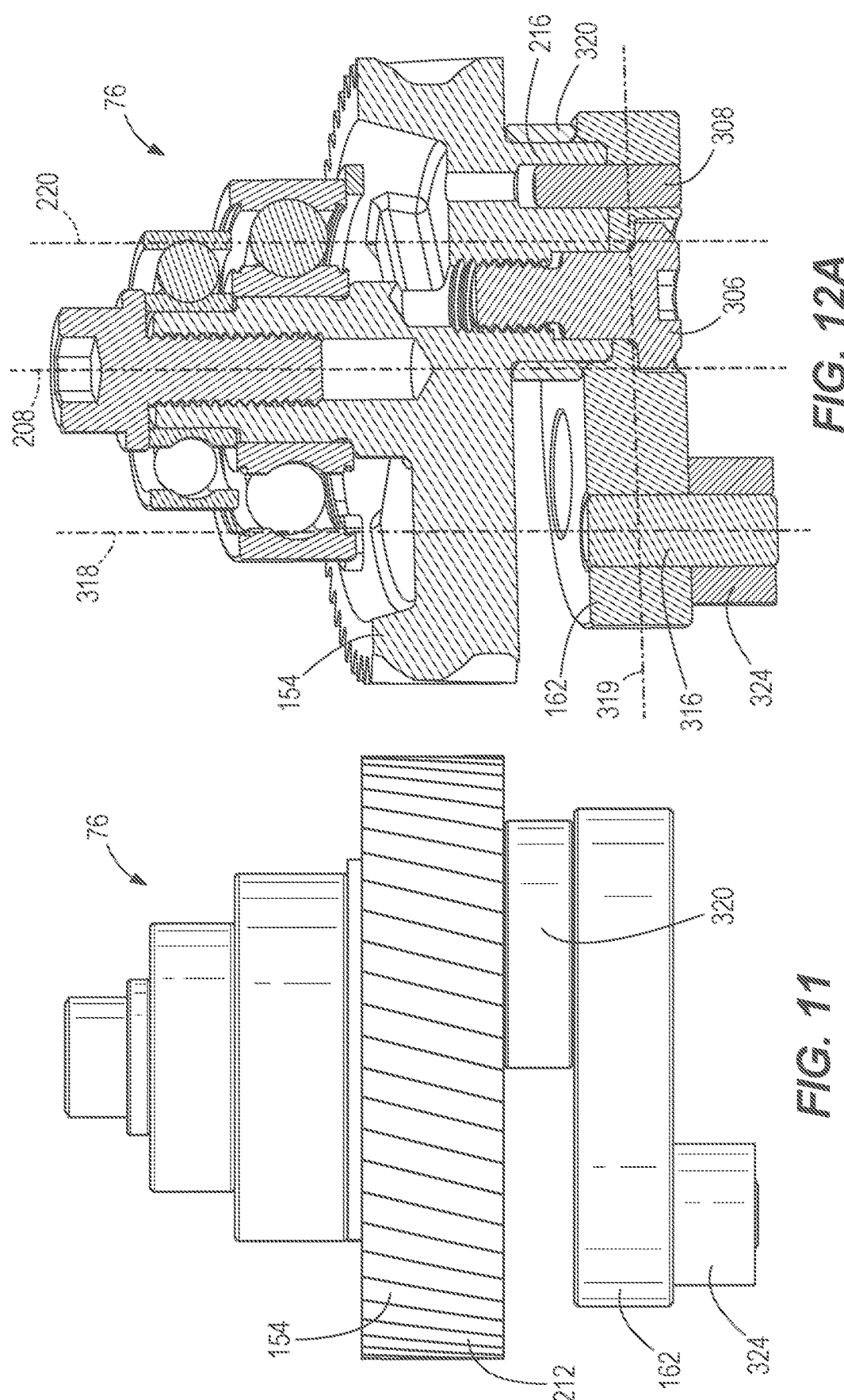
FIG. 11 is a side view of the transmission of FIG. 10.
FIG. 12A is a cross-sectional view of the transmission of FIG. 10 taken along the line 12A-12A of FIG. 10.
Figure 12B:
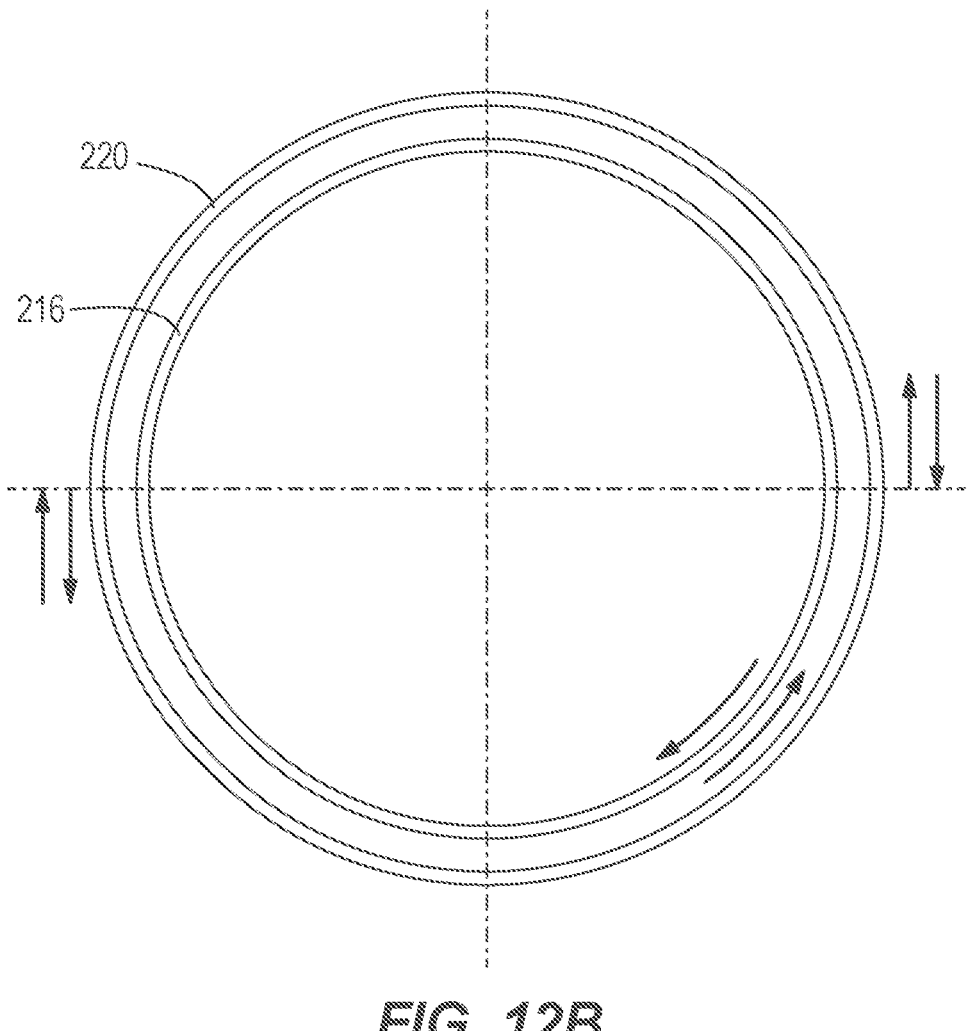
FIG. 12B is a schematic view of a bearing and a portion of the transmission of FIG. 12A.

FIGS. 10-12 illustrate the drive assembly 76 according to one embodiment of the invention. The illustrated drive assembly 76 includes a driving gear 150, an output gear 154 (e.g., a driven gear), a counterweight 158, a crankshaft 162, and the spindle assembly 166. In other embodiments, the drive assembly 76 may include fewer or more components. The driving gear 150 is coupled to the output shaft 104 of the motor 68 for rotation with the output shaft 104. The output shaft 104 is oriented along a motor axis 170. The illustrated driving gear 150 is a pinion gear that includes a plurality of teeth 174 and that is rotatable about the motor axis 170.

Further with respect to FIGS. 11-14, the output gear 154 includes a first side 200, a second side 204 opposite the first side 200, a rotation axis 208, a plurality of teeth 212, and an eccentric shaft 216. The rotation axis 208 extends generally centrally through the output gear 154. The rotation axis 208 of the output gear 154 is oriented parallel to the motor axis 170. The teeth 212 of the output gear 154 are positioned on an outer circumference thereof and are configured to engage with the teeth 174 of the driving gear 150. The eccentric shaft 216 extends from the second side 204 the output gear 154 and extends along an eccentric axis 220, which is parallel to the rotation axis 208. In the embodiments of FIGS. 1A-27, the motor 68 is positioned forward of the output gear 154, as will be discussed below. In some embodiments, such as that of FIG. 28, the motor 68 is positioned rearward of the output gear 154, as will be discussed below.

Figure 17:
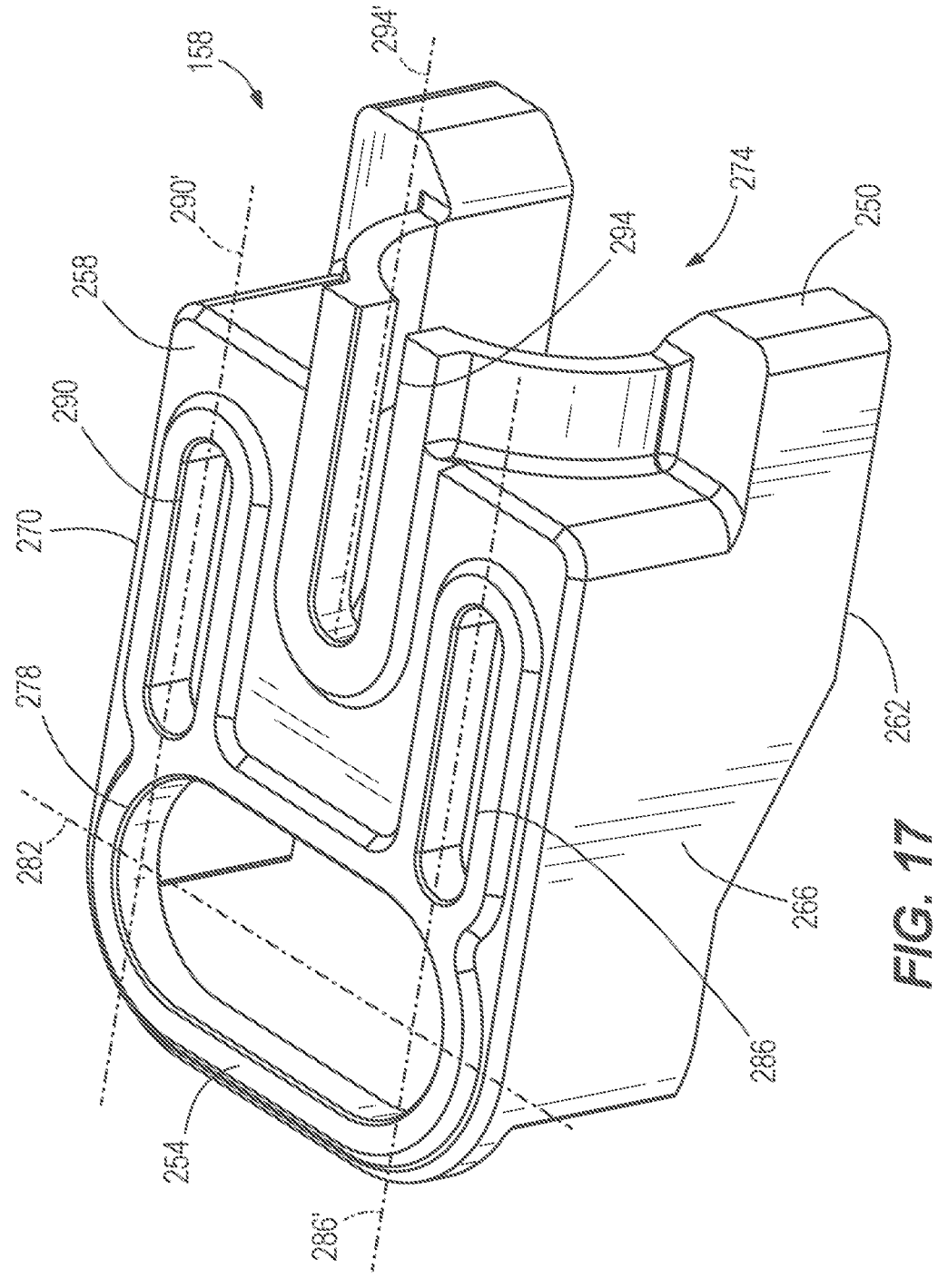
FIG. 17 is a perspective view of the counterweight of FIG. 10.
Figure 20:
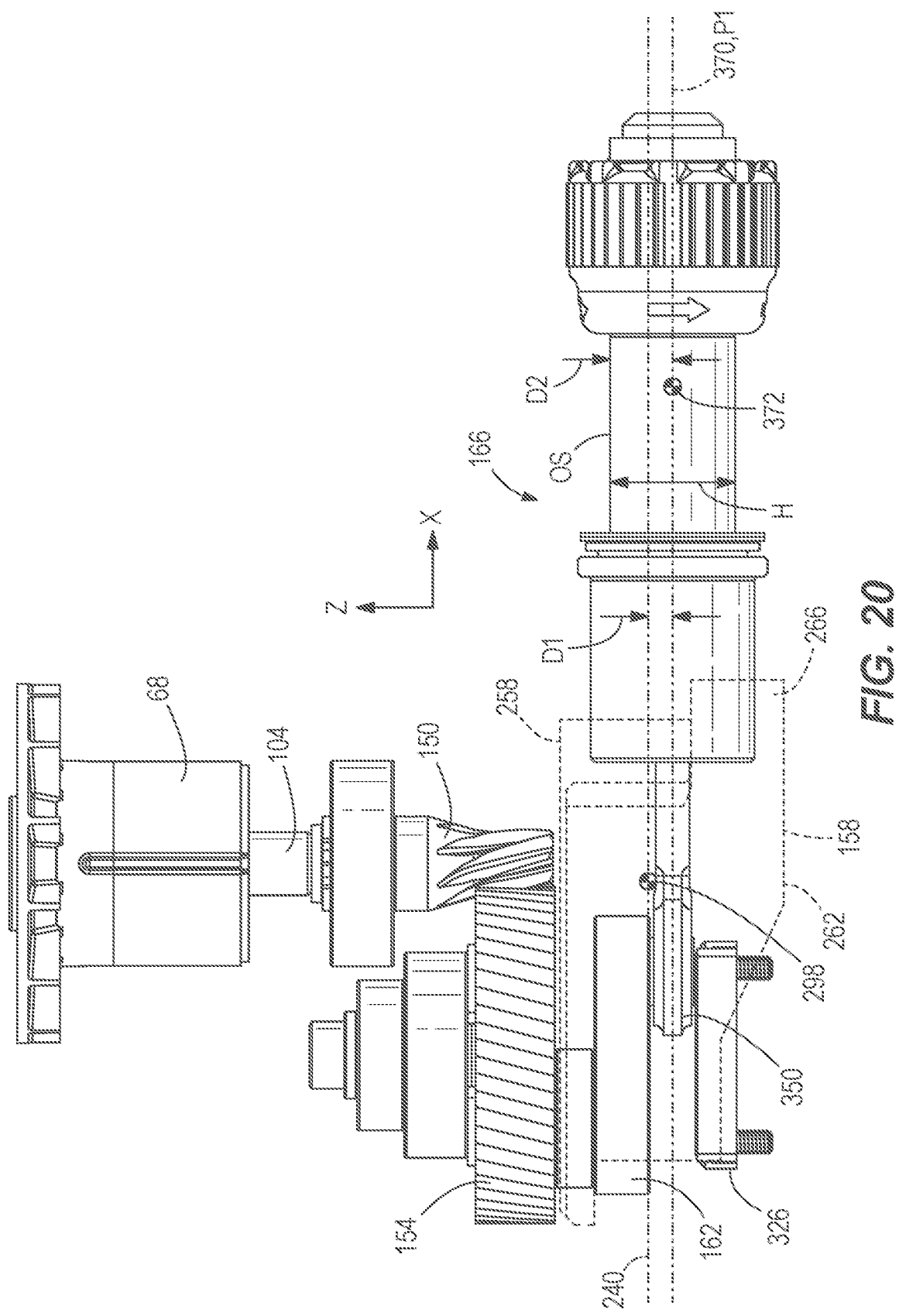
FIG. 20 is a side view of the spindle and the counterweight of FIG. 10 in a first position.
Figure 21:
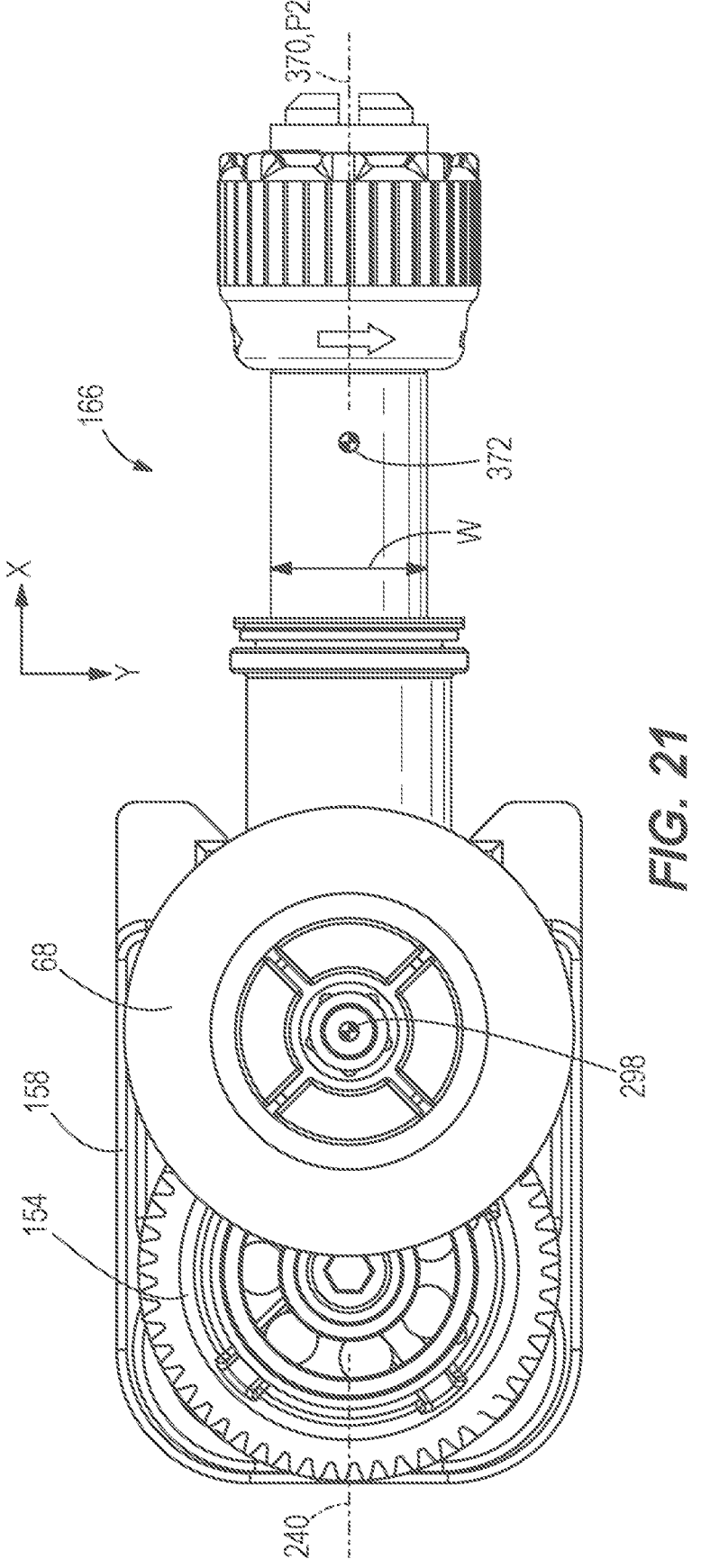
FIG. 21 is a top view of the spindle and the counterweight of FIG. 10 in the first position.
Figure 22:
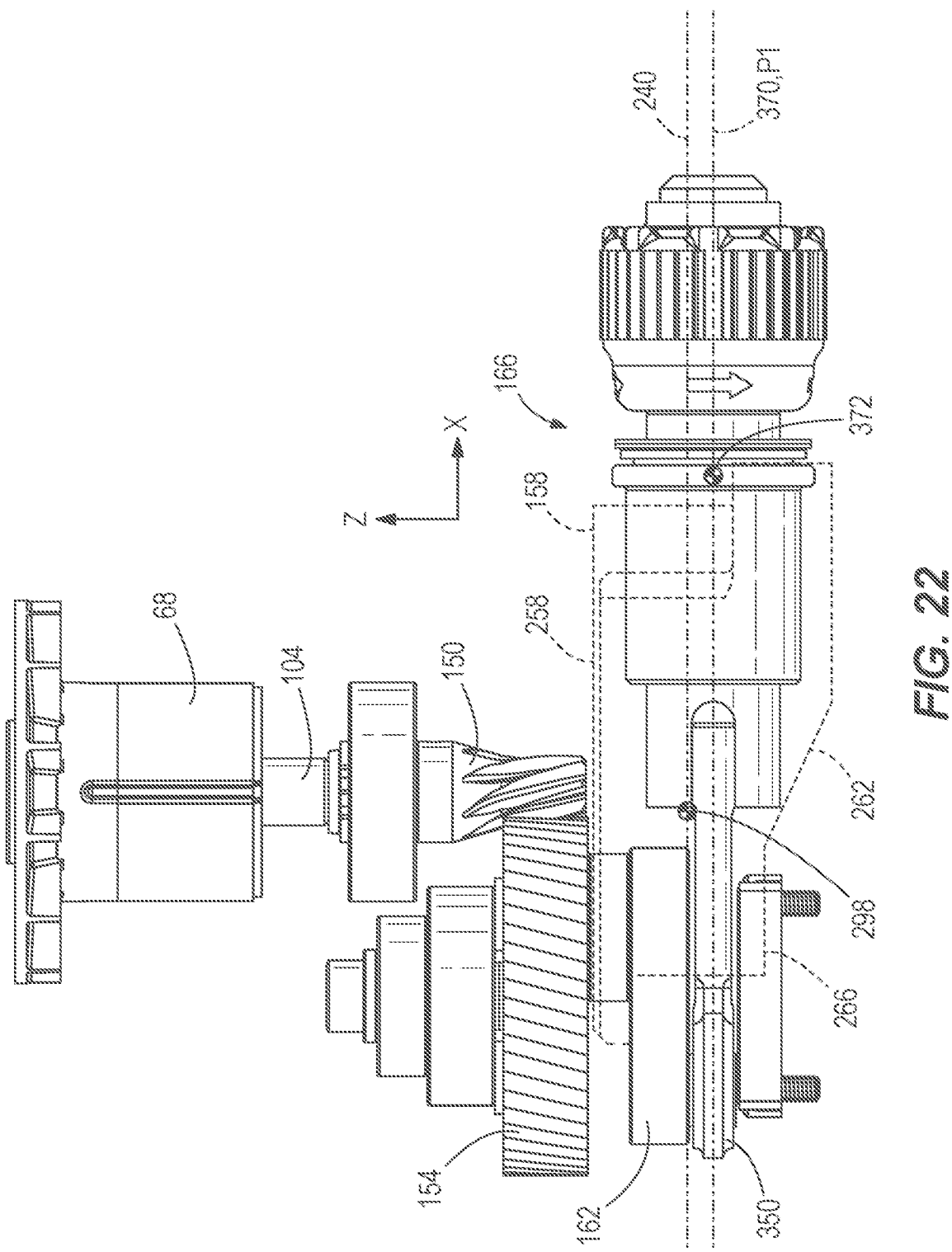
FIG. 22 is a side view of the spindle and the counterweight of FIG. 10 in a second position.
Figure 23:
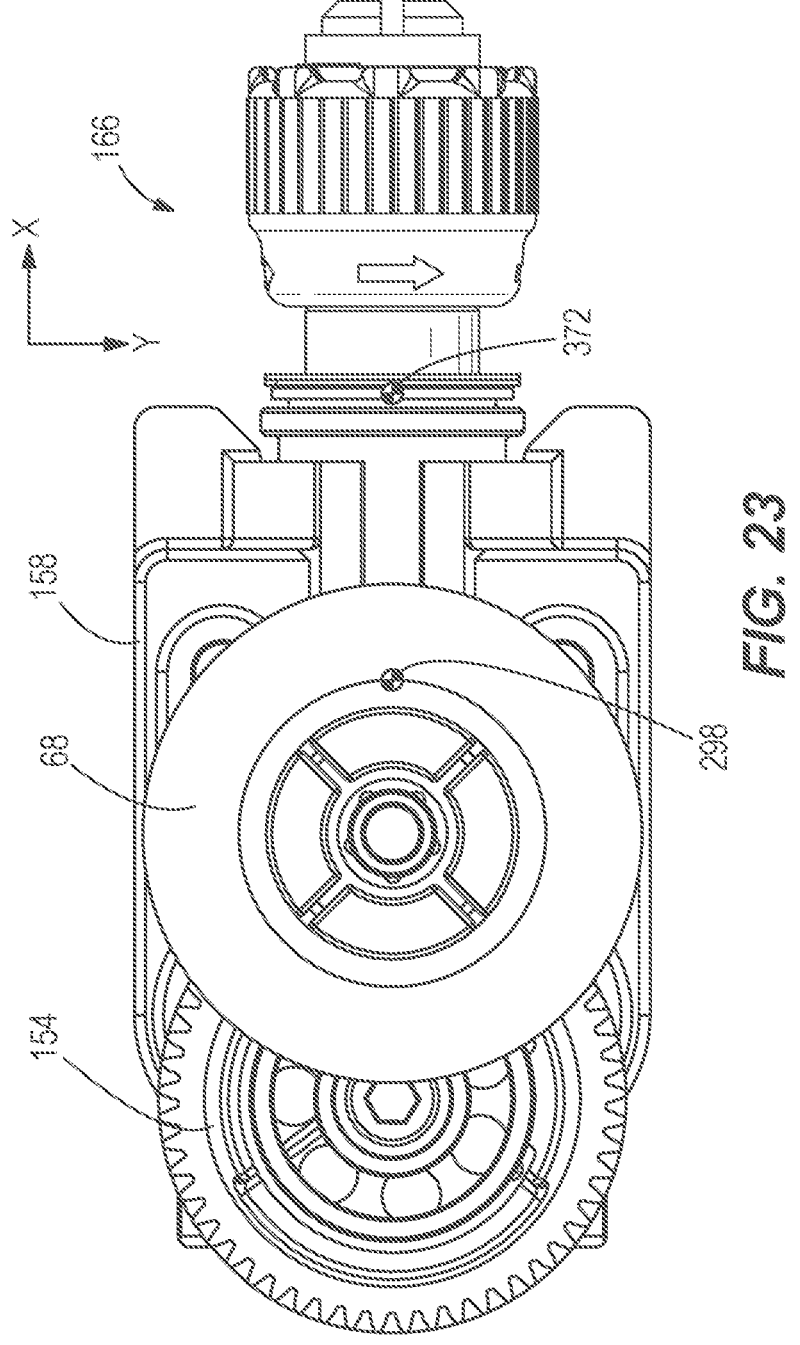
FIG. 23 is a top view of the spindle and the counterweight of FIG. 10 in the second position.
Figures 24, 25, 26:
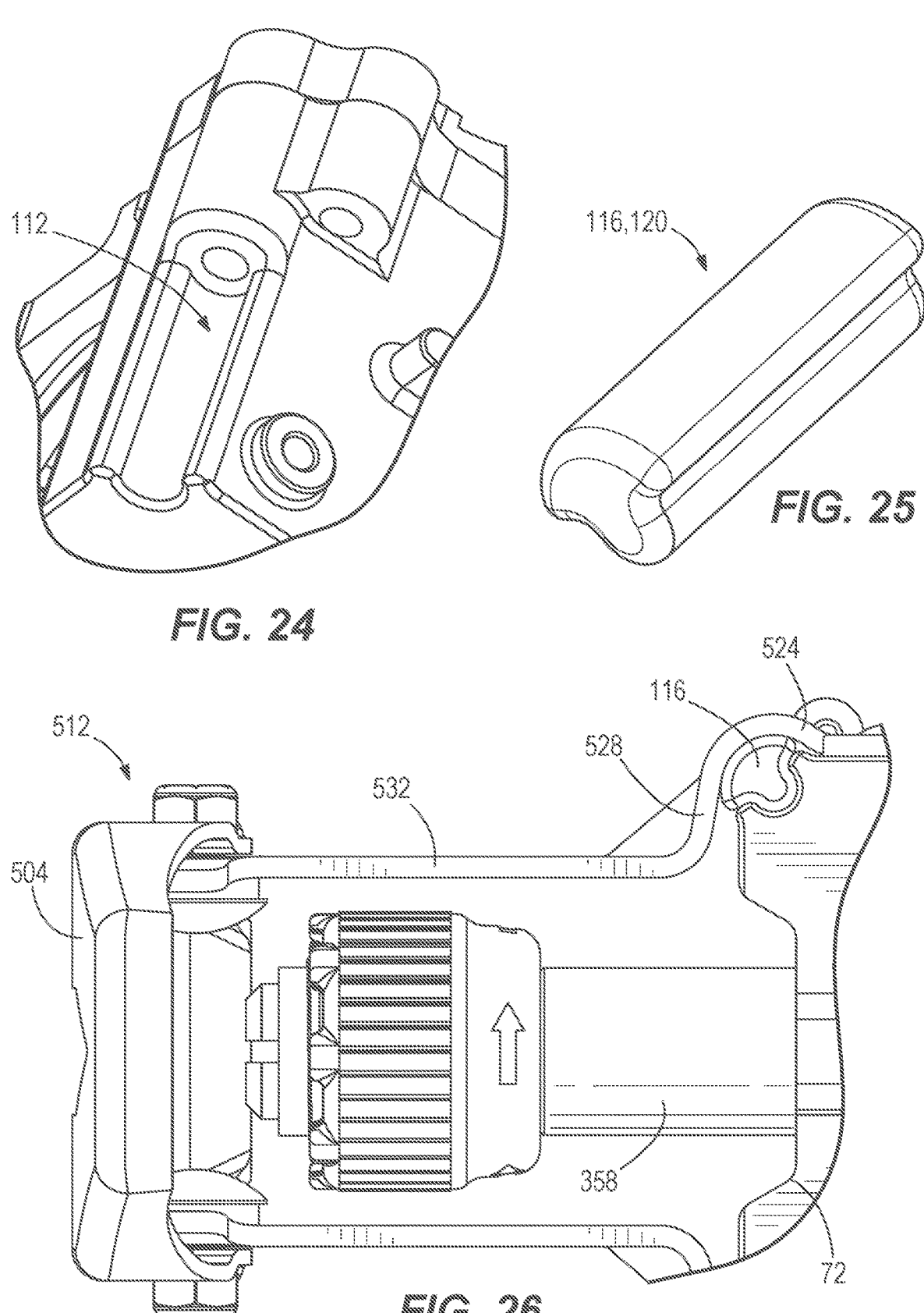
FIG. 24 is a perspective view of the gear case of FIG. 5 with the elastic member removed.
FIG. 25 is a perspective view of the elastic member of FIG. 5.
FIG. 26 is a detailed top view of the gear case, the elastic member, the spindle assembly, and the shoe assembly of FIG. 3.

As shown in FIGS. 10 and 17, the illustrated counterweight 158 is configured as a first scotch yoke mechanism. As will be discussed in greater detail below, the counterweight 158 is configured to reciprocate along a first reciprocation axis 240 (FIGS. 20-22). The counterweight 158 includes a body having a first end 250 (e.g., a front end), a second end 254 (e.g., a rear end) opposite the first end 250, a first or top side 258, a second or bottom side 262 opposite the first side 258, a third side 266, and a fourth side 270 opposite the third side 266. The body also defines a recess 274 in the second side 262. The first end 250 defines a first yoke including a first elongated aperture 278. In other embodiments, the counterweight 158 may have other configurations. In the illustrated embodiment, the first elongated aperture 278 extends from the third side 266 to the fourth side 270. The first elongated aperture 278 defines a first elongated aperture axis 282. The first elongated aperture axis 282 is oriented perpendicular to the rotation axis 208 of the output gear 154. The eccentric shaft 216 extends through the first elongated aperture 278 and is movable within the first elongated aperture 278. A second elongated aperture 286 is positioned adjacent the third side 266, a third elongated aperture 290 is positioned adjacent the fourth side 270, and an elongated slot 294 is positioned between the second elongated aperture 286 and the third elongated aperture 290. Each of the second elongated aperture 286, the third elongated aperture 290, and the elongated slot 294 extends between the first end 250 and the second end 254. Each of the second elongated aperture 286, the third elongated aperture 290, and the elongated slot 294 are oriented along a respective axis 286', 290' 294', which are parallel to one another and perpendicular to the first elongated aperture axis 282. In the illustrated embodiment, as shown in FIGS. 20-21, the counterweight defines a center of gravity 298 that is positioned between the first side 258 and the second side 262 and between the third side 266 and the fourth side 270. In the illustrated embodiment, the center of gravity 298 is positioned along the first reciprocation axis 240.

Figure 7:
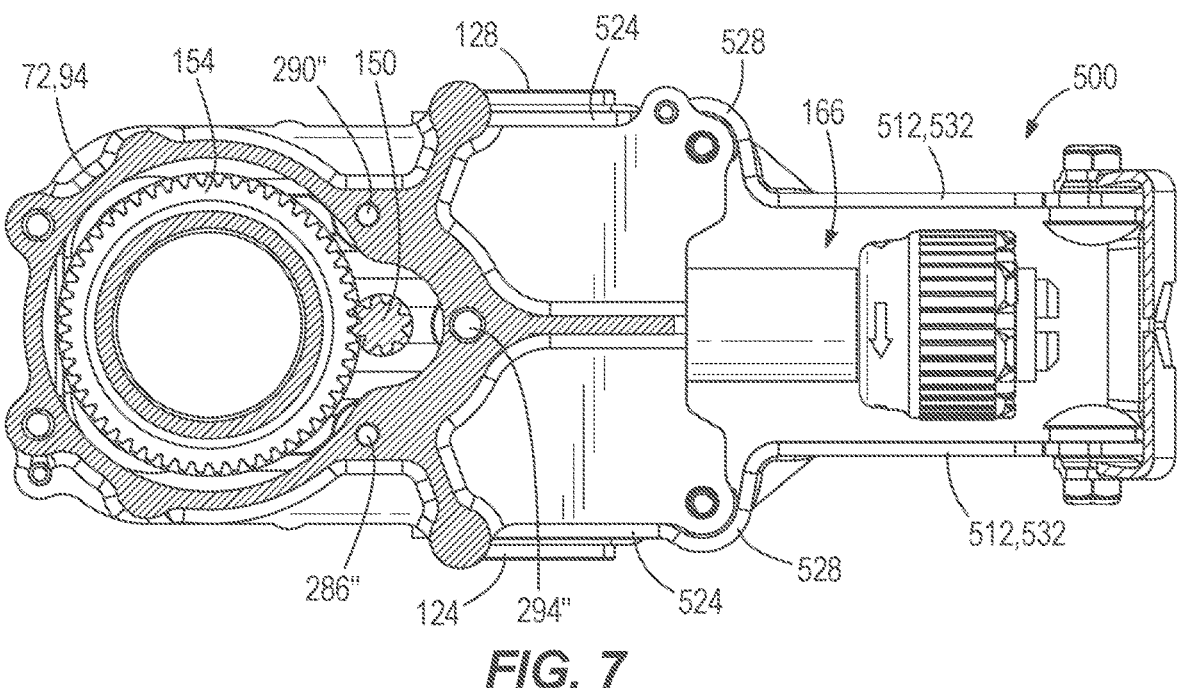
FIG. 7 is a cross-sectional view of a portion of the reciprocating saw taken along the line 7-7 of FIG. 3.
Figure 8:
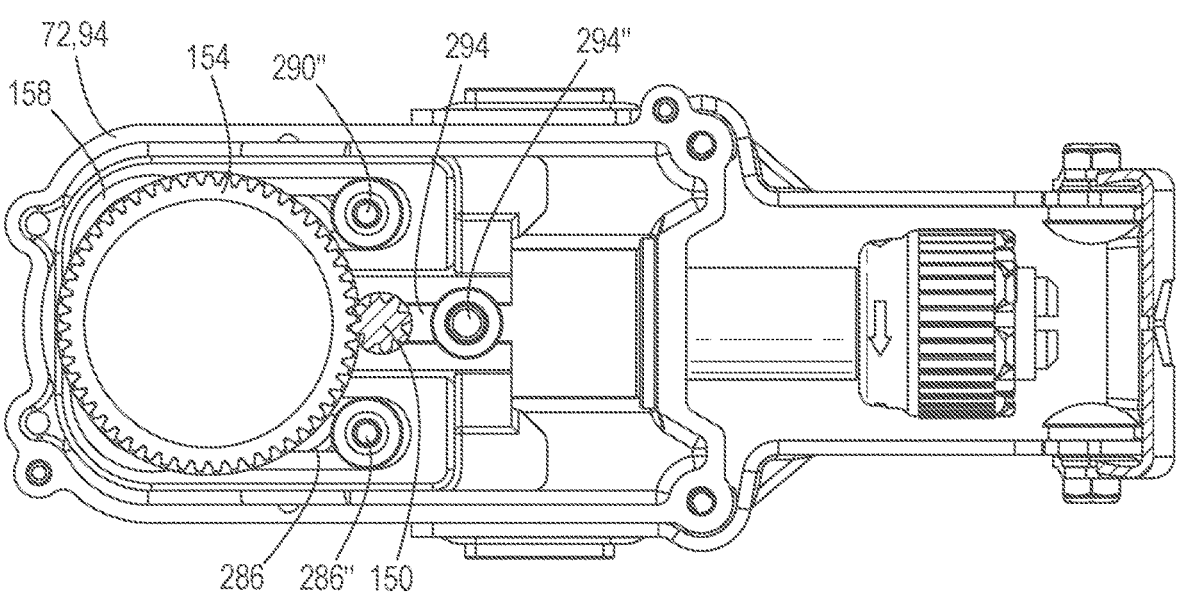
FIG. 8 is a cross-sectional view of a portion of the reciprocating saw taken along the line 8-8 of FIG. 3.

As shown in FIGS. 2, 7, and 8, in the illustrated embodiment, a first fastener 286" and a second fastener 290" clamp or otherwise stabilize the counterweight 158 relative to the gear case 72 (e.g., the first gear case portion 90) while still allowing the counterweight to translate, as will be discussed in greater detail below. The first fastener 286" is coupled to the first gear case portion 90 and extends through the second elongated aperture 286, and the second fastener 290" is coupled to the first gear case portion 90 and extends through the third elongated aperture 290. A guide pin 294" (FIGS. 7 and 8) extends from the first gear case portion 90 toward the second gear case portion 94 and is received in the elongated slot 294. The fasteners 286", 290" and the guide pin 294" constrain the side-to-side movement of the counterweight 158 while allowing axial movement (e.g., reciprocation) of the counterweight 158.

Figures 13, 14, 15, 16:
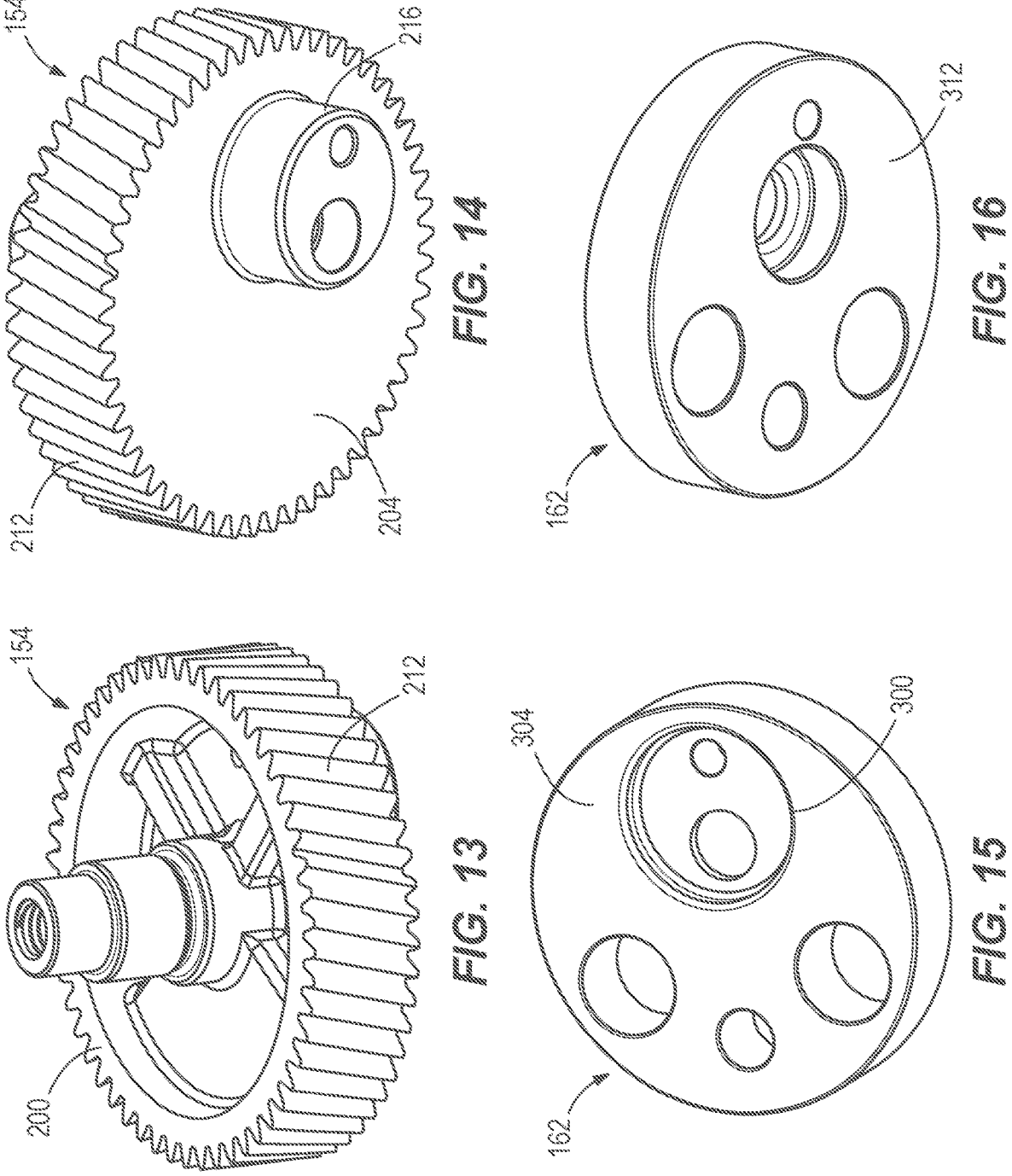
FIG. 13 is a perspective view of a gear of the transmission of FIG. 11.
FIG. 14 is another perspective view of the gear of the transmission of FIG. 11.
FIG. 15 is a perspective view of a crankshaft of the transmission of FIG. 11.
FIG. 16 is another perspective view of the crankshaft of the transmission of FIG. 11.

As shown in FIGS. 12A, 15, and 16, the crankshaft 162 is coupled to the output gear 154. The crankshaft 162 is therefore rotatable with the output gear 154 about the rotation axis 208 thereof. In particular, a center of the crankshaft 162 is coaxial with the rotation axis 208 of the output gear 154. As shown, the crankshaft 162 includes a recess 300 in a first side 304 that matingly receives at least a portion of the eccentric shaft 216 of the output gear 154. In the illustrated embodiment, the crankshaft 162 is coupled to the output gear 154 via a fastener 306 and a first pin 308, both of which extend from a second side 312 of the crankshaft 162 at least partially through the eccentric shaft 216. In other embodiments, the eccentric shaft 216 may be press-fit into the recess 300 of the crankshaft 162. In still other embodiments, the output gear 154, the eccentric shaft 216, and the crankshaft 162 may be integrally formed with one another. Accordingly, the eccentric shaft 216 is coupled to crankshaft 162 such that there is no relative rotation therebetween. A second pin 316 is coupled to and extends from the second side 312 of the crankshaft 162. The second pin 316 includes a first end coupled to the crankshaft 162 and a second end that extends from the second side 312 of the crankshaft 162. The second pin 316 defines a pin axis 318, which is parallel to the rotation axis 208 and the eccentric axis 220. The fastener 306 and the first pin 308 are each positioned on an opposite side of the rotation axis 208 from the second pin 316. Also, the eccentric axis 220 of the eccentric shaft 216 is spaced apart from the pin axis 318 by 180 degrees. In the illustrated embodiment, the fastener 306, the first pin 308, and the second pin 316 are aligned with one another along an axis 319 that extends through the centers of each. Also, the fastener 306 and the first pin 308 are spaced apart from the second pin 316 by 180 degrees.

With reference to FIGS. 11 and 12A, a first bearing 320 surrounds the eccentric shaft 216 and is positioned between the output gear 154 and the crankshaft 162. In some embodiments, the first bearing 320 is a rolling contact bearing (e.g., a roller bearing). As such, the first bearing 320 includes rollers (not shown) that rotate between inner and outer rings to allow rotation of the eccentric shaft 216. In some embodiments, such as FIG. 12B, the first bearing 320 is a plain bearing that is movably coupled to the eccentric shaft 216. In particular, the plain bearing 320 is configured to rotate relative to the eccentric shaft 216. As the eccentric shaft 216 rotates with the output gear 154, the plain bearing 320 is able to rotate relative to the eccentric shaft 216. Accordingly, the inner surface of the plain bearing 320 undergoes non-constant relative sliding motion relative to an outer surface of the eccentric shaft 216, and an outer surface of the plain bearing 320 is configured to rotate (e.g., roll) relative to a surface of the elongated aperture 278 (e.g., the yoke) of the counterweight 158 during reciprocation of the counterweight 158. In the illustrated embodiment, during one revolution of the output gear 154, the plain bearing 320 rotates about the circumference of the eccentric shaft 216 one time. In order to complete the one rotation, the plain bearing 320 is able to rotate in a first direction relative to the eccentric shaft 216 and a second direction relative to the eccentric shaft 216 in response to contacting various points of the surface of the elongated aperture 278. The first bearing 320 contrasts a bearing that is not able to move relative to the eccentric shaft 216 and is only configured to slide relative to the surface of the elongated aperture 278 of the counterweight 158. The benefits of the first bearing 320 are that it reduces system friction and aids in reducing component wear for smooth tool operation over its life span. A second bearing 324 surrounds the second end of the second pin 316. The second bearing 324 may have any suitable configuration including a rolling contact bearing or plain bearing. A retention face 326 engages the second end of the second pin 316 such that the retention face 326 inhibits the second bearing 324 from becoming uncoupled from the second pin 316 (shown in FIG. 20). In the illustrated embodiment, the crankshaft 162 may include one or more apertures extending between the first side 304 and the second side 312, which reduce the overall weight of the crankshaft 162.

Figures 18, 19:
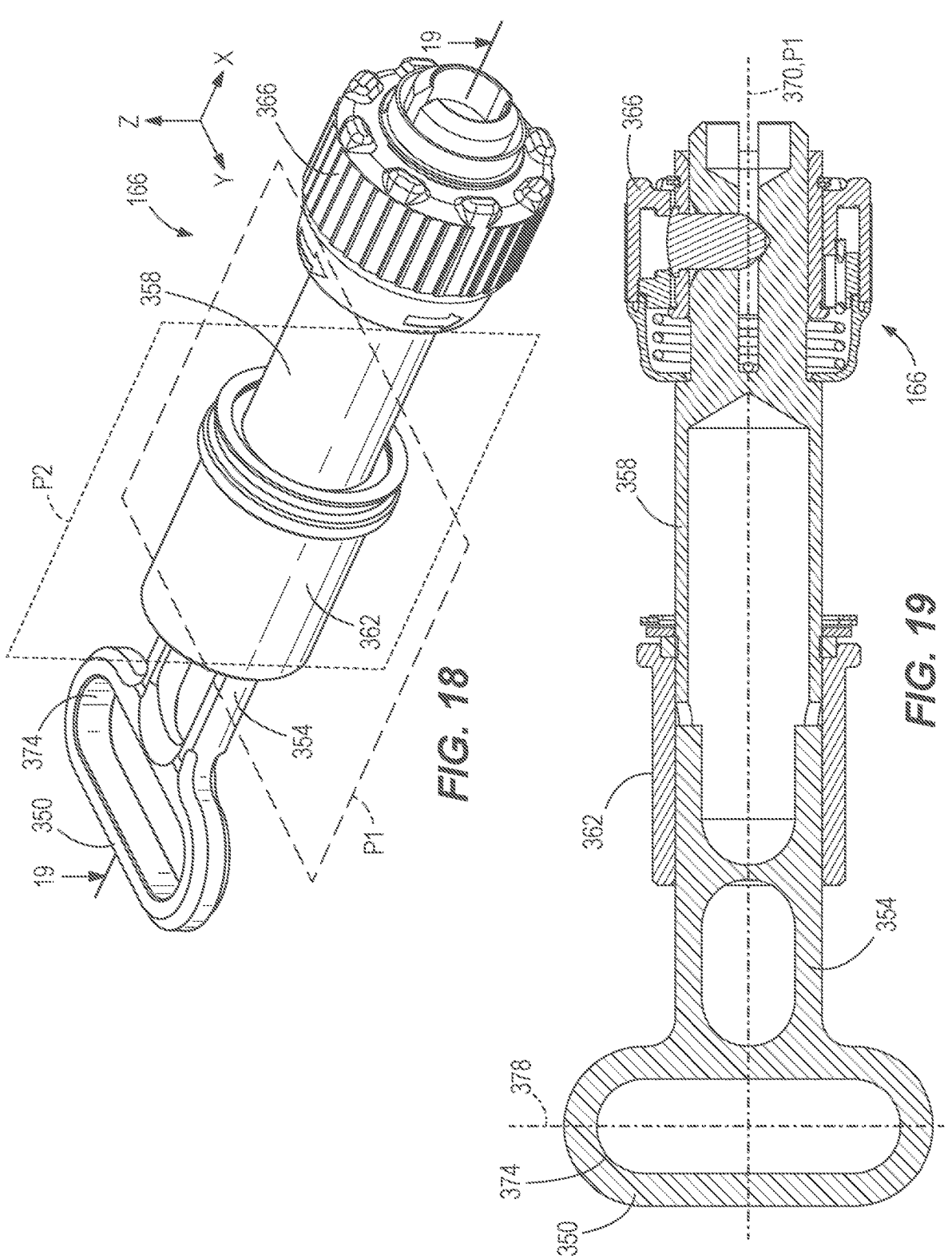
FIG. 18 is a perspective view of the spindle assembly of FIG. 3.
FIG. 19 is a cross-sectional view of the spindle assembly of FIG. 3 taken along the line 19-19 of FIG. 18.

With respect to FIGS. 18-19, the illustrated spindle assembly 166 is configured as a second yoke mechanism. That is, the spindle assembly 166 includes a second yoke 350, a yoke shaft 354, a spindle shaft 358, a spindle bushing 362, and a blade clamp 366. The blade clamp 366 is opposite the second yoke 350. In other embodiments, the spindle assembly 166 may include fewer or more components. In the illustrated embodiment, the second yoke 350 and yoke shaft 354 are separate from and coupled to the spindle shaft 358. As shown, the yoke shaft 354 is coupled to the spindle shaft 358. In other embodiments, the second yoke 350 and/or yoke shaft 354 may be integrally formed as a single piece with the spindle shaft 358. The spindle bushing 362 surrounds at least a portion of the yoke shaft 354 and the spindle shaft 358. The spindle assembly 166 defines a first plane P1 (e.g., a XY plane) and a second plane P2 (e.g., a XZ plane) and. The spindle assembly 166 defines a second reciprocation axis 370 of the saw 10. In the illustrated embodiment, the second reciprocation axis 370 extends centrally through the spindle shaft 358. That is, the second reciprocation axis 370 is positioned at an intersection between the first plane P1 and the second plane P2. Even further, in the illustrated embodiments, the second reciprocation axis 370 is positioned a center point along a height H (FIG. 20) and a width W (FIG. 21) of the spindle assembly 166 (e.g., spindle shaft 358). In other embodiments, the second reciprocation axis 370 may be offset from either or both of the first plane P1 and the second plane P2, and therefore may be offset from the center point along the height H or width W. Additionally, a center of gravity 372 of the spindle assembly 166 is positioned along the second reciprocation axis 370. Although not shown in detail, a tool element, such as a saw blade, is coupled to the spindle shaft 184 via the blade clamp 366. The blade clamp 366 may include the blade clamp assembly shown and described in U.S. Pat. No. 6,725,548, entitled "Keyless Blade Clamp Mechanism", and issued Apr. 27, 2004, the contents of which are hereby incorporated by reference. The blade clamp 366 can also be configured to accept a variety of reciprocating saw blades, jig saw blades, and/or hack saw blades. During operation, the tool element reciprocates along the second reciprocation axis 370. With respect to FIG. 19, the second yoke 350 has elongated aperture 374 extending therethrough. The elongated aperture 374 defines an elongated aperture axis 378. The elongated aperture axis 378 is perpendicular to the second reciprocation axis 370.

As shown in FIGS. 10 and 20-23, when assembled, the counterweight 158 is at least partially positioned between the output gear 154 and the crankshaft 162. The counterweight 158 is also at least partially positioned between the output gear 154 and the gear case 72. In the illustrated embodiment, the first elongated aperture 278 is positioned between the output gear 154 and the crankshaft 162 such that the eccentric shaft 216 extends through the first elongated aperture 278. The crankshaft 162 is positioned within the recess 274 of the counterweight 158. Also, the spindle assembly 166 is positioned within and movable within the recess 274 of the counterweight 158. As shown in FIGS. 2 and 9, the second side 262 of the counterweight 158 is positioned adjacent to the bottom inner surface of the second gear case portion 94. Moreover, the third and fourth sides 266, 270 are positioned on opposite sides of the arcuate guide wall 140.

As shown in FIGS. 10, 20, and 22, the spindle assembly 166 extends generally through the counterweight 158. That is, the spindle assembly 166 is generally positioned between the first side 258 and the second side 262 of the counterweight 158 and between the third side 266 and the fourth side 270 of the counterweight 158. Accordingly, a portion of the counterweight 158 is above the spindle assembly 166 and a portion of the counterweight 158 is below the spindle assembly 166. The counterweight 158 also has portions on either side of the spindle assembly 166. In the illustrated embodiments, the center of gravity 298 of the counterweight 158 is preferably located within the height H of the spindle assembly 166. In some embodiments, such as FIGS. 30B and 30C, discussed in greater detail below, the center of gravity 298 is located within both the first plane P1 and the second plane P2. In such case, the center of gravity 298 is located along the second reciprocation axis 370, and therefore, the first reciprocation axis 240 and the second reciprocation axis 370 are coincident with one another. In the embodiment illustrated in FIGS. 1A-27, the center of gravity 298 is vertically offset from the first plane P1 by a distance D1 and located within second plane P2. In such case, the first reciprocation axis 240 and the second reciprocation axis 370 are parallel with one another with the first reciprocation axis 240 being offset from the second reciprocation axis 240 by the distance D1. In the illustrated embodiment, the distance D1 is less than a distance D2 between the first plane P1 and the outer surface OS of the spindle shaft 358. In other embodiments, the distance D1 is less than a distance between the first plane P1 and an inner surface of the spindle bushing 362. In still other embodiments, the distance D1 is less than a distance between the first plane D1 and an outer surface of the spindle bushing 362. As shown in FIG. 20, the center of gravity 298 is vertically offset above the first plane P1 (and in this case the second reciprocation axis 370), but the in other embodiments, the center of gravity 298 may be vertically offset below the first plane P1. The relative axes 240, 370 and centers of gravity 298, 372 may reduce or eliminate the vibrations in the x-direction (e.g., along the x-axis), the y-direction (e.g., along the y-axis), and the z-direction (e.g., the z-axis), as well as pitch vibration (e.g., rotation about the y-axis), roll vibration (e.g., rotation about the x-axis), and yaw vibrations (e.g., rotation about the z-axis).

Moreover, the second pin 316 and the second bearing 324 are received by the elongated aperture 374 in the second yoke 350 of the spindle assembly 166. The elongated aperture axis 378 is perpendicular to the rotation axis 208 of the output gear 154. Also, the elongated aperture axis 378 is parallel to the first elongated aperture axis 282 of the counterweight 158. The second yoke 350 is positioned between and vertically constrained by the crankshaft 162 and a plate 400 that is coupled to gear case 72. As shown in FIG. 9, the plate 400 is coupled to the second gear case portion 74 by fasteners 404 as well as the projection 102 of the second gear case portion 94 that extends through an aperture 412 of the plate 400. Additionally, the arcuate guide wall 140 receives and supports the spindle shaft 358. As shown, the spindle shaft 358 extends through the opening 106 in the second gear case portion 94 such that the spindle shaft 358 and blade clamp 366 project from the gear case 72. The spindle bushing 362 is positioned within the gear case 72 and supports the relative movement of the spindle shaft 358 relative to the gear case 72.

As the motor 68 rotates the driving gear 150 about the output shaft 104, the output gear 154 rotates about the rotation axis 208. Rotation of the output gear 154 causes the eccentric shaft 216 to rotate about the rotation axis 208. Because the eccentric shaft 216 is received within the first elongated aperture 278 of the counterweight 158, rotation of the eccentric shaft 216 causes the counterweight 158 to reciprocates along the first reciprocation axis 240. Also, rotation of the eccentric shaft 216 causes co-rotation of the crankshaft 162 about the rotation axis 208, which causes the second pin 316 to rotate about the rotation axis 208. Because the second pin 316 is received within the elongated aperture 374 of the spindle assembly 166, rotation of the second pin 316 causes the spindle assembly 166 to reciprocate along the second reciprocation axis 370. As noted above, the first reciprocation axis 240 may be coincident with or parallel to the second reciprocation axis 370. Because the eccentric shaft 216 and the second pin 316 are 180 degrees out of phase with one another, the counterweight 158 and the spindle assembly 166 reciprocate opposite to one another. The stroke length of the counterweight 158 may be at least 70% the stroke length of the spindle assembly 166.

Figure 27:
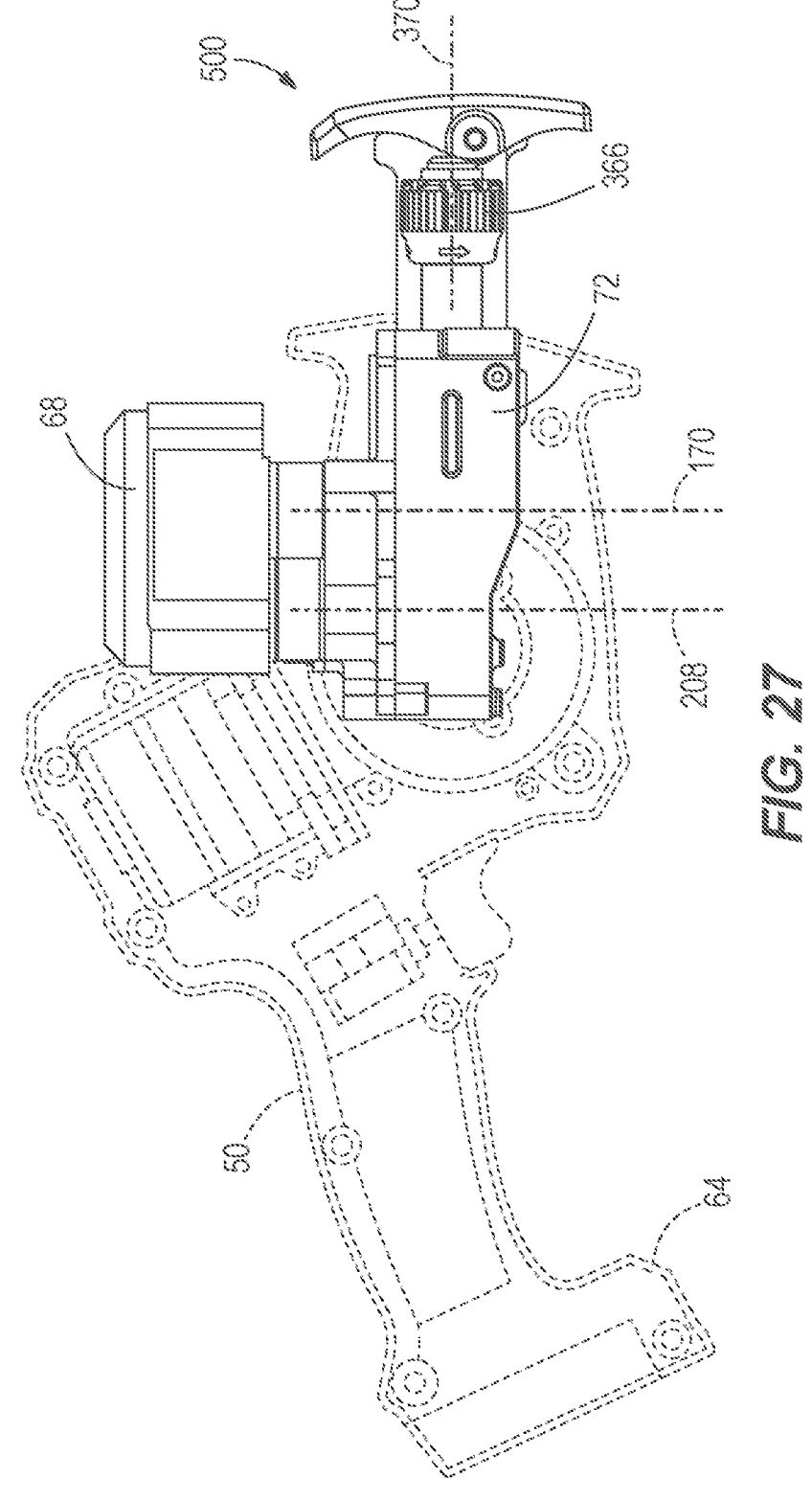
FIG. 27 illustrates the motor, the gear case, and the transmission of FIG. 1A relative to a conventional reciprocating saw.
Figure 28:
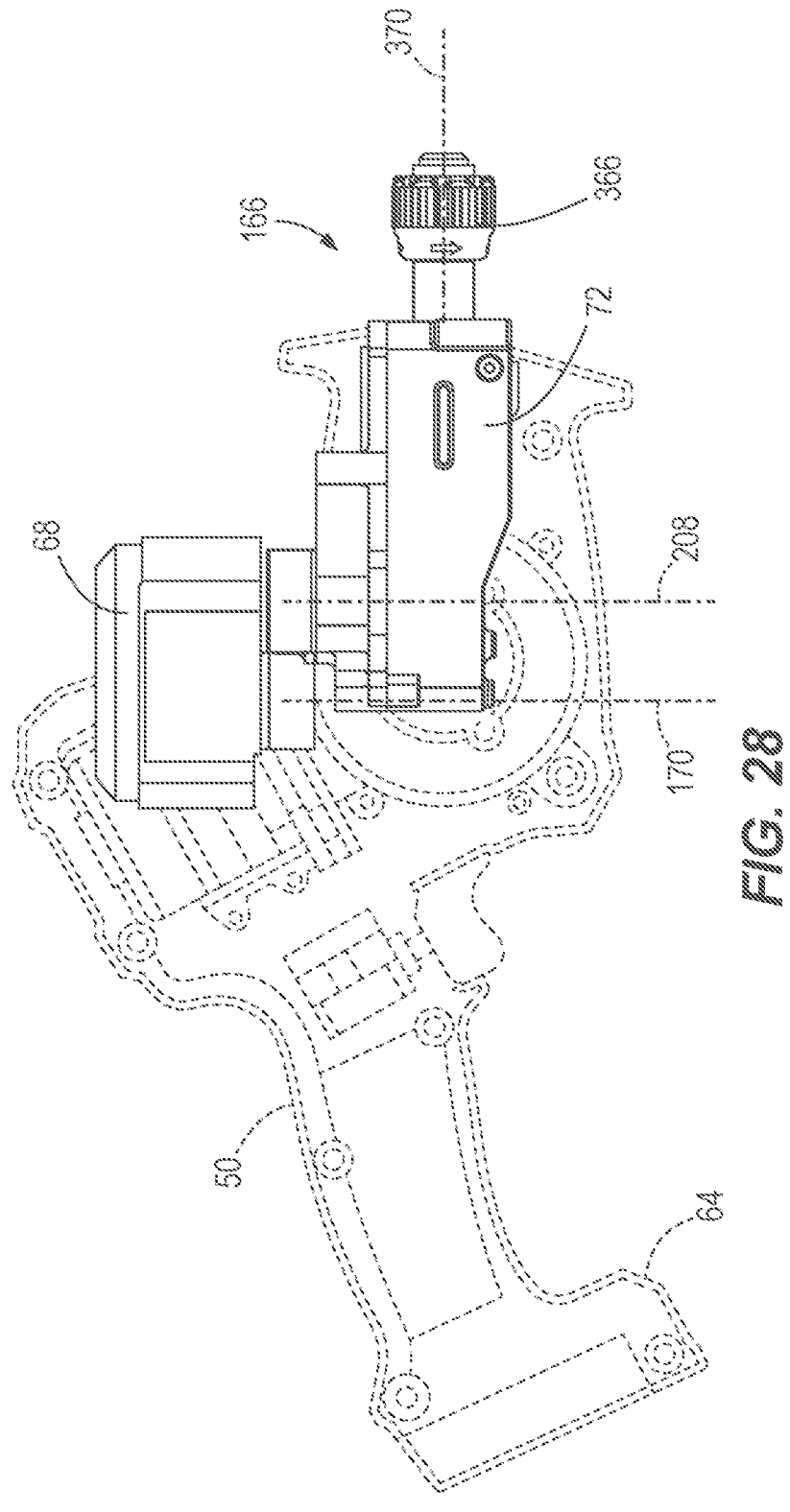
FIG. 28 illustrates a motor, a gear case, and a transmission according to another embodiment relative to a conventional reciprocating saw.

In some embodiments, such as that of FIG. 27, the motor 68 (and therefore the motor output shaft 104 and motor axis 170 thereof) is positioned between the output gear 154 (and therefore the rotation axis 208 thereof) and the blade clamp 366. This configuration reduces the size of the drive assembly 76 relative to conventional drive assemblies, while maintaining the same stroke of the spindle assembly 166 of the drive assemblies of conventional reciprocation mechanisms. In other embodiments, such as that of FIG. 28, the output gear 154 (and the rotation axis 208 thereof) may be positioned between the motor 68 (and therefore the motor output shaft 104 and the motor axis 170 thereof) and the blade clamp 366. Regardless of the placement of the motor 68 (and therefore the motor output shaft 104) relative to the output gear 154, the rotation axis 208 of the output gear 154 and the motor axis 170 of the motor 68 are offset from one another in a direction along the second reciprocation axis 370. This configuration reduces the size of the drive assembly 76 relative to conventional drive assemblies and the drive assembly 76 of FIGS. 1A-27. Accordingly, reducing the size of the drive assembly 76 allows the size of the housing 40 to be correspondingly reduced. In the illustrated embodiment, the length of the motor housing portion may be reduced by between 10% and 20%, while the length of the gear case housing portion may be reduced by between 5% to 10%. Moreover, the overall height of the motor housing portion and the gear case portion may be reduced by between 10% and 20%.

Figure 1B:
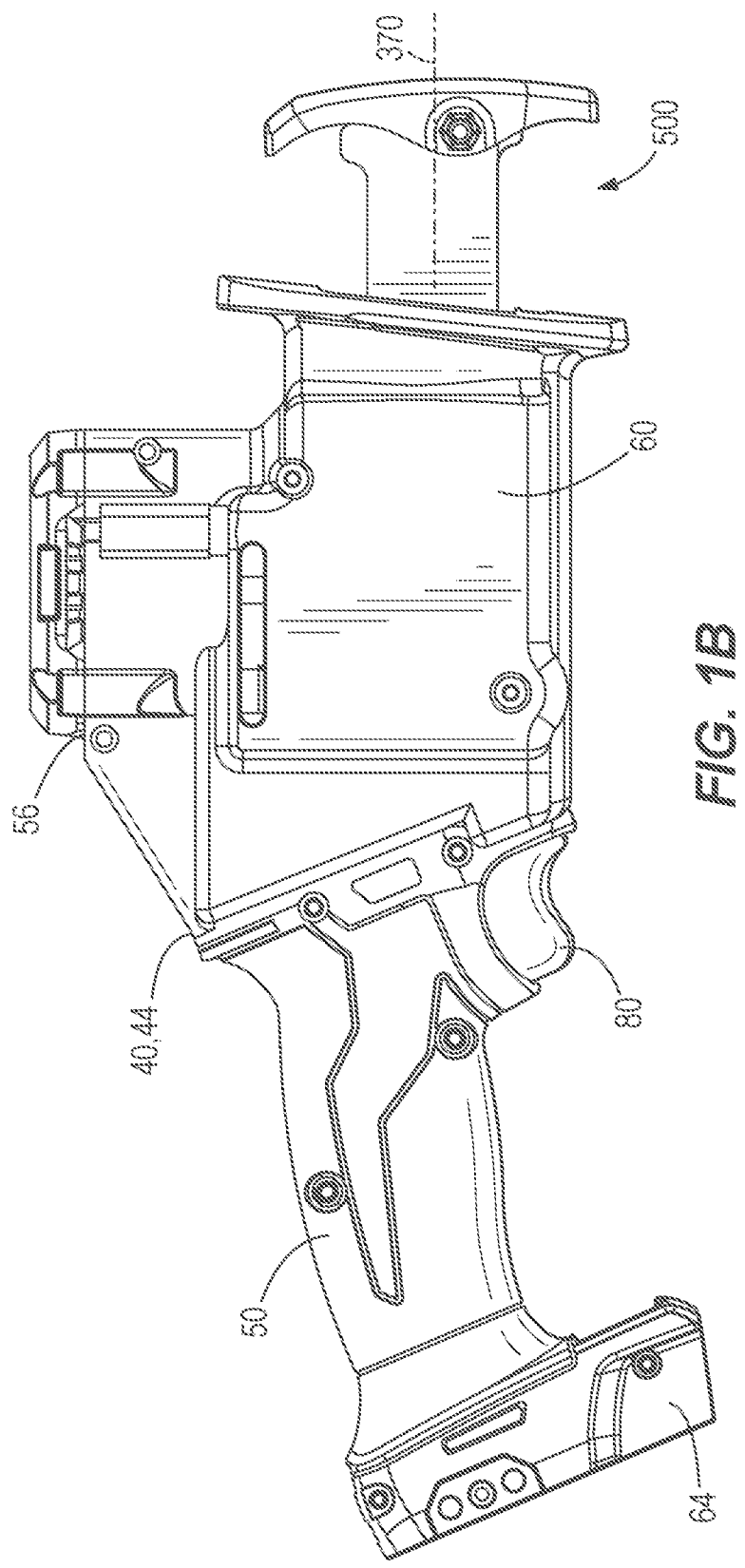
FIG. 1B is a side view of the reciprocating saw shown in FIG. 1A.
Figure 2:
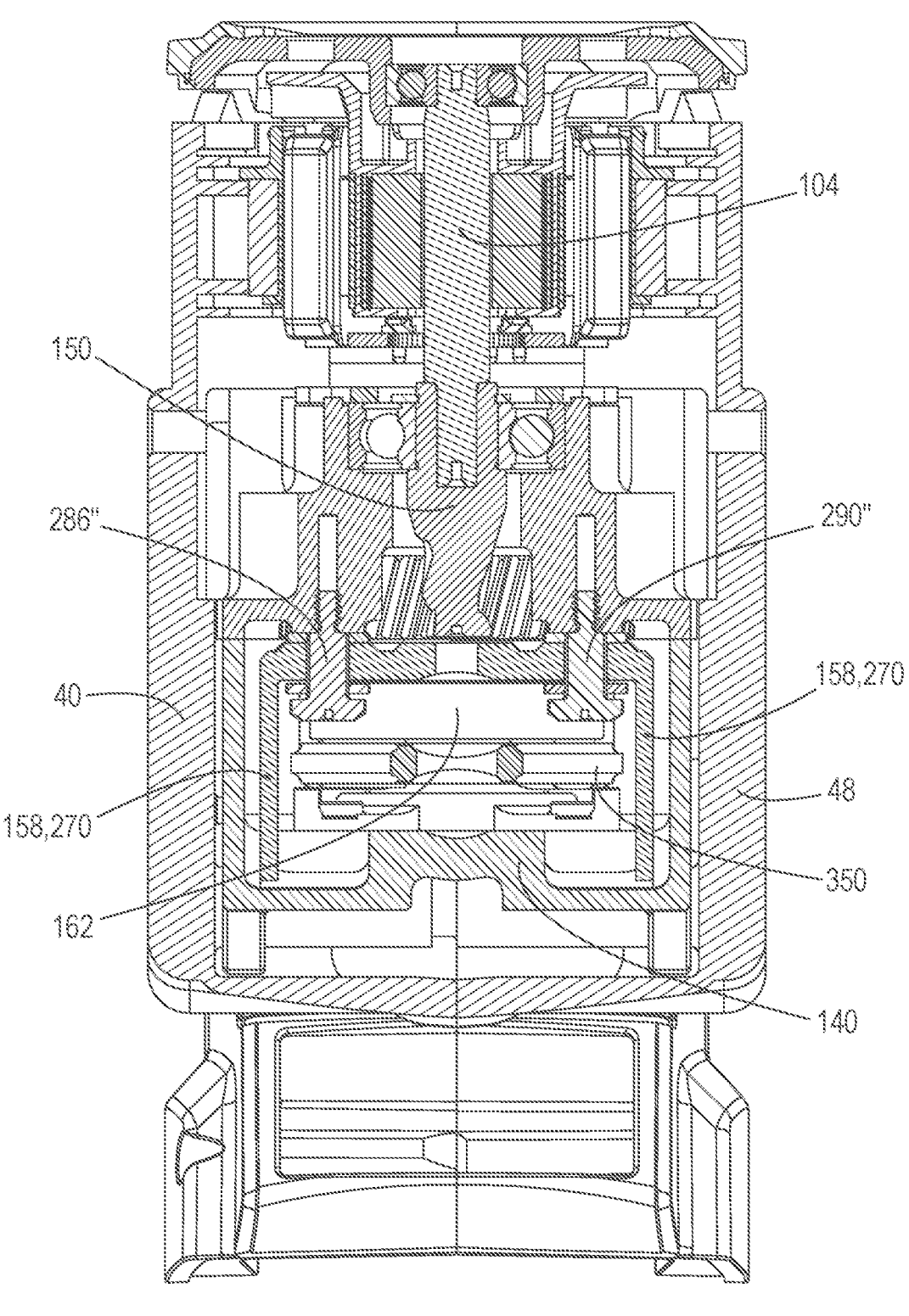
FIG. 2 is a cross-sectional view of the reciprocating saw taken along the line 2-2 of FIG. 1A.

As shown in FIGS. 1A and 1B, the saw 10 also includes a shoe assembly 500. The shoe assembly 500 is coupled relative to a front end of the housing 40 opposite from the battery pack. In the embodiment shown, the shoe assembly 500 is a movable (e.g., pivotable) shoe assembly. The shoe assembly 500 includes a front surface or plate 504 which engages or rests on a workpiece. As shown in FIG. 3, the front plate 504 also defines an opening 508 for the tool element to pass through. The front plate 504 is movably or pivotably coupled to two connecting legs 512, which connect the shoe assembly 500 relative to the housing 40. The front plate 504 is pivotable about an axis 520. In other embodiments (not shown), the shoe assembly 500 may be an otherwise adjustable shoe assembly or a fixed show assembly.

At least a portion of the connecting legs 512 are positioned on and coupled to (via fasteners) opposite sides of the gear case 72. Moreover, the spindle shaft 358 and blade clamp 366 extend between the connecting legs 512. As shown in FIG. 4, each of the connecting legs 512 includes a first end coupled to the gear case 72 and a second end coupled to the front plate 504. Also, each of the connecting legs 512 includes a first portion 524 extending from the first end in a direction toward the second end, a second portion 528 coupled to the first portion 524, and a third portion 532 coupled to the second portion 528 and extending from the second portion 528 to the second end. Each of the first and second portions 524, 532 are straight portions, while the second portion 528 is a bent portion. A distance between the first portions 524 of the connecting legs 512 is greater than a distance between the second portions 532 of the connecting legs 512. An elongated slot 536 extends through each of the first portions 524 and a recess 540 extends through each of the first portions 524. Each of the elongated slots 536 receives the respective first or second projections 124, 128 of the gear case 72. The length of each of the elongated slots 536 parallel to the second reciprocation axis 370 is greater than the length of the respective projection 124, 128 such that a clearance exists between the corresponding elongated slots 536 and elongated projections 124, 128. Similarly, a length of the recess 540 parallel to the second reciprocation axis 370 is longer than a dimension (e.g., diameter) of the projections 132 such that a clearance exists between the corresponding recess 540 and projection 132. As shown, the shoe assembly 500 is therefore movable axially relative to the gear case 72 due to axial vibrations. As the shoe assembly 500 moves axially, each of the connecting legs 512 (e.g., the bent portions 528 thereof) axially abuts the gear case 72. The axial vibrations are absorbed by the elastic members 116, 120 to reduce the load felt by the gear case 72, which are eventually felt by the user. The gear case 72 is therefore configured as a shock absorber from in-application vibration due to the cutting loads and fixturing of the tool to the workpiece.

FIGS. 30A-40 illustrate a saw 610 according to another embodiment of the invention. The saw 610 is similar to the saw 10 described above. As such, like components are given like reference numbers, plus 600, and only differences between the saw 10 and the saw 610 are described below.

Figure 31:
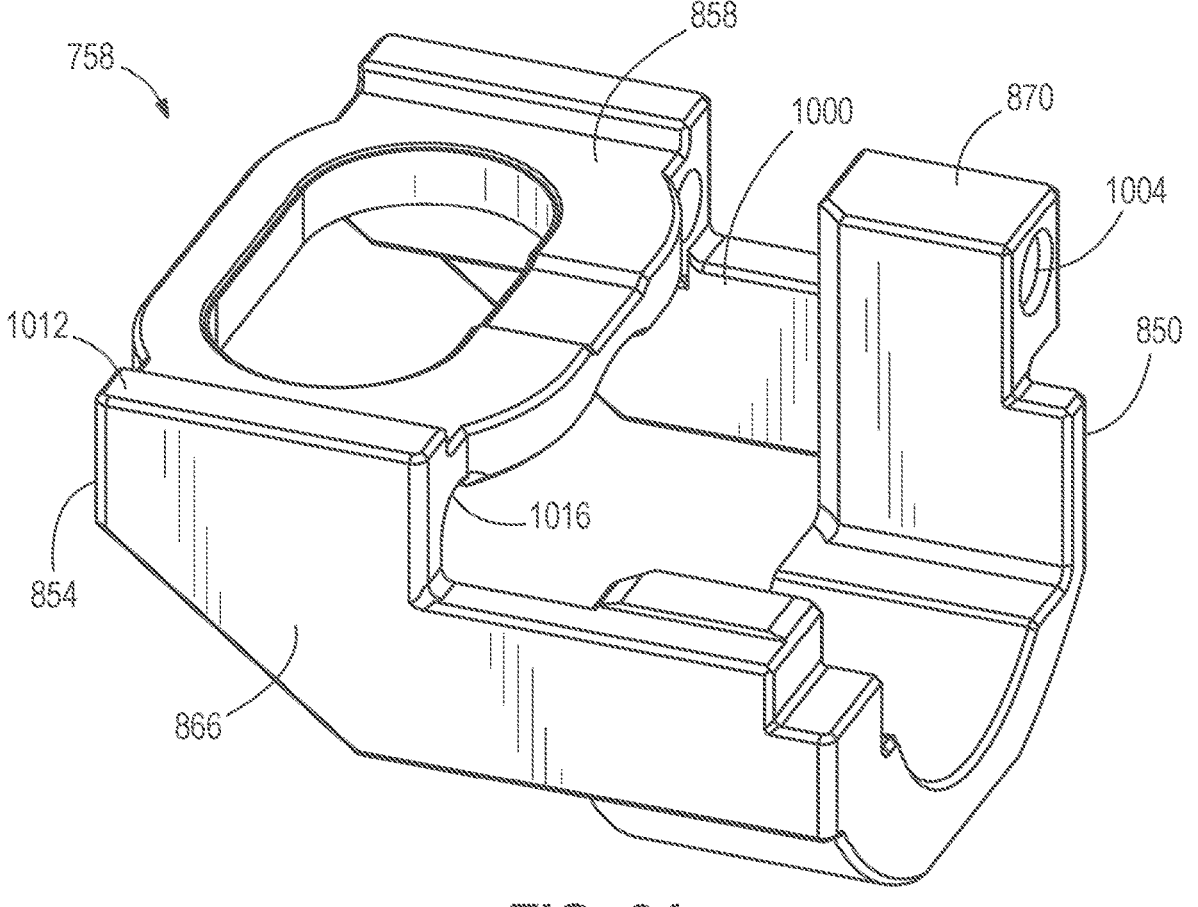
FIG. 31 is a perspective view of a counterweight of the reciprocating saw of FIG. 30A.
Figure 32:
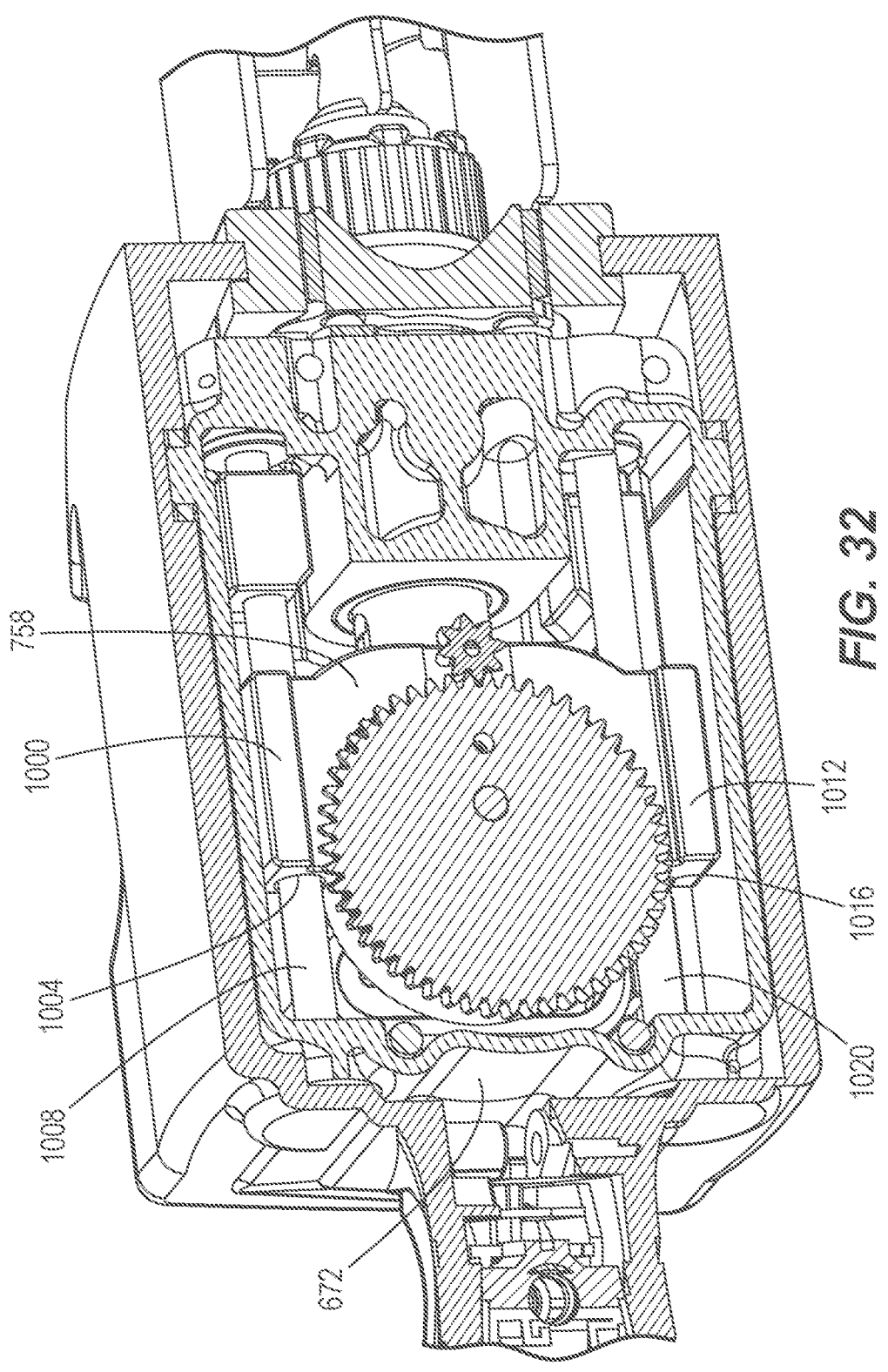
FIG. 32 is a cross-sectional view of a portion of the reciprocating saw taken along line 32-32 of FIG. 30A.

With reference to FIGS. 31 and 32, similar to the saw 10, the saw 610 includes a counterweight 758 configured as a first scotch yoke mechanism within a gear case 672. Like the counterweight 158, the counterweight 758 includes a body having a first end 850 (e.g., a front end), a second end 854 (e.g., a rear end) opposite the first end 850, a first or top side 858, a second or bottom side 862 opposite the first side 858, a third side 866, and a fourth side 870 opposite the third side 866. The fourth side 870 defines a wall 1000 having a first hole 1004 extending between the first end 850 and the second end 854. The first hole 1004 defines a circular cross-sectional shape. In other embodiments, the first hole 1004 may include a rectangular, oblong, or a similar cross-sectional shape. The first hole 1004 is sized to receive a first rail 1008 disposed within the gear case 672 (as shown in FIG. 32).

With reference to FIG. 31, the third side 866 defines a wall 1012 having an interior edge 1016. The interior edge 1016 is defined between the third side 866 and the first side 858. The interior edge 1016 is curved. In other embodiments, the interior edge 1016 may define an alternate shape. The interior edge 1016 is shaped such that the interior edge 1016 may receive a second rail 1020 (as shown in FIG. 32). In other words, the second rail 1020 partially supports the counterweight 758 by sitting at the interior edge 1016. In other embodiments, the second rail 1020 may be disposed within a second hole formed in the wall 1012. In some embodiments, the second hole may be a mirror image of the first hole 1004. In other embodiments, the second hole may be distinct from the first hole 1004. When the counterweight 758 is disposed within the gear case 672, the first rail 1008 is disposed in the first hole 1004 and the gear case 672 sits on the second rail 1020 at the interior edge 1016. The counterweight 758 is supported by the first and the second rails 1008, 1020 and may slide along the first and second rails 1008, 1020 within the gear case 672. The first and rails 1008, 1020 provide the counterweight 758 with increased axial balance within the gear case 672. Although not illustrated, it should be understood that the embodiments of FIGS. 1A-28 may include the gear case 972 and rails 1008, 1020 of FIGS. 34-40.

Figure 30A:
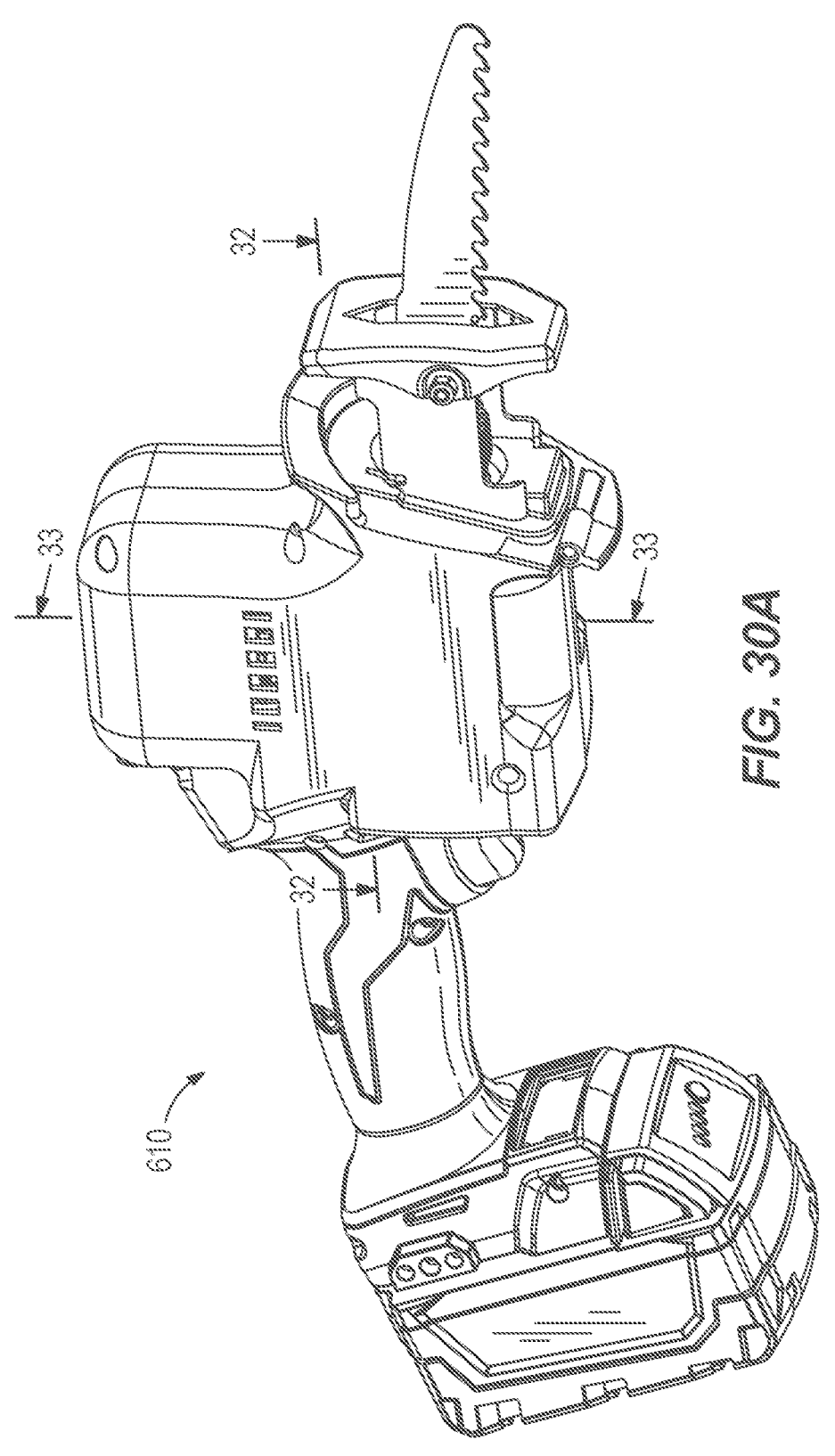
FIG. 30A illustrates a perspective view of a reciprocating saw according to another embodiment of the invention.
Figure 30B:
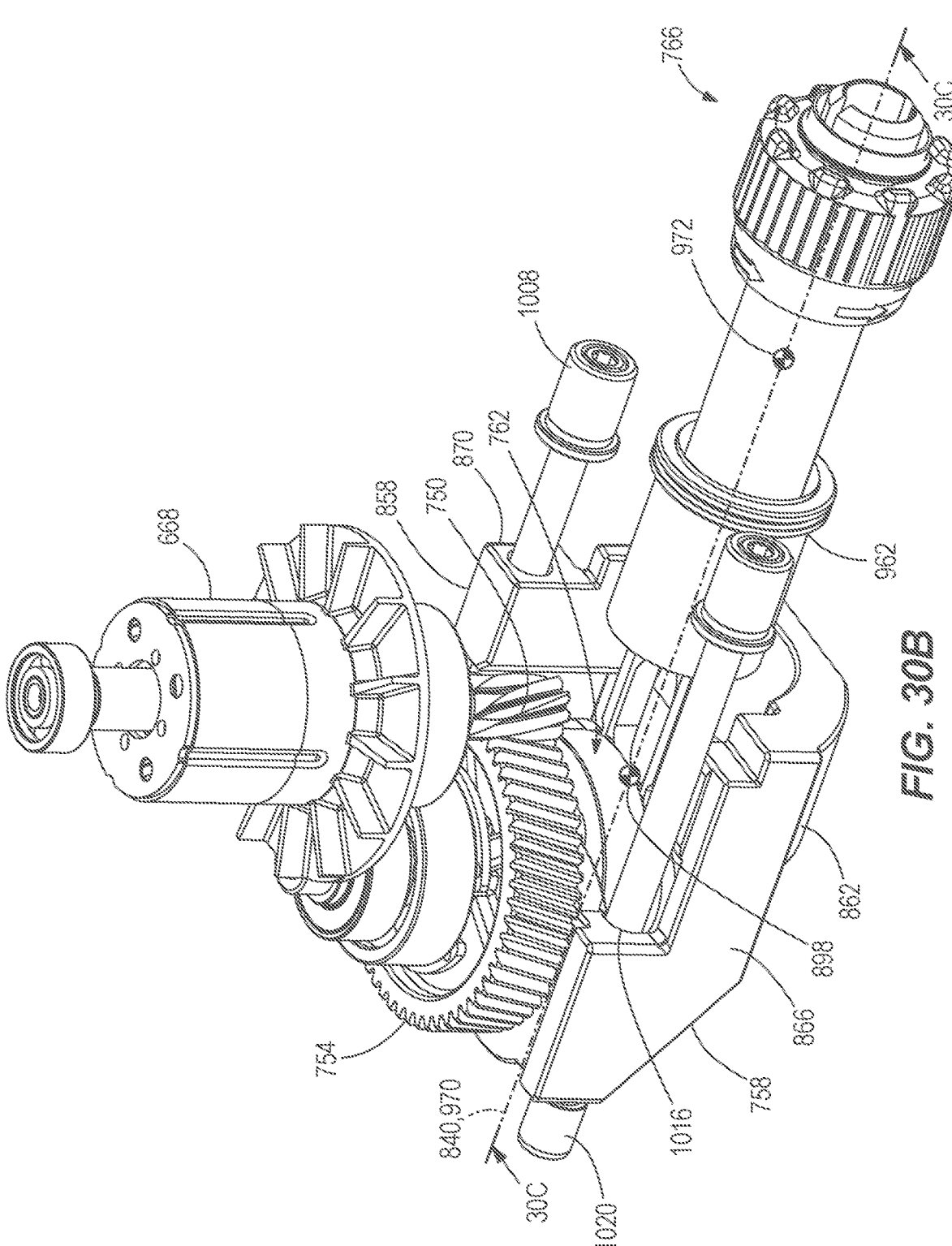
FIG. 30B illustrates a perspective view of the reciprocating saw of FIG. 30A with a housing removed.
Figure 30C:
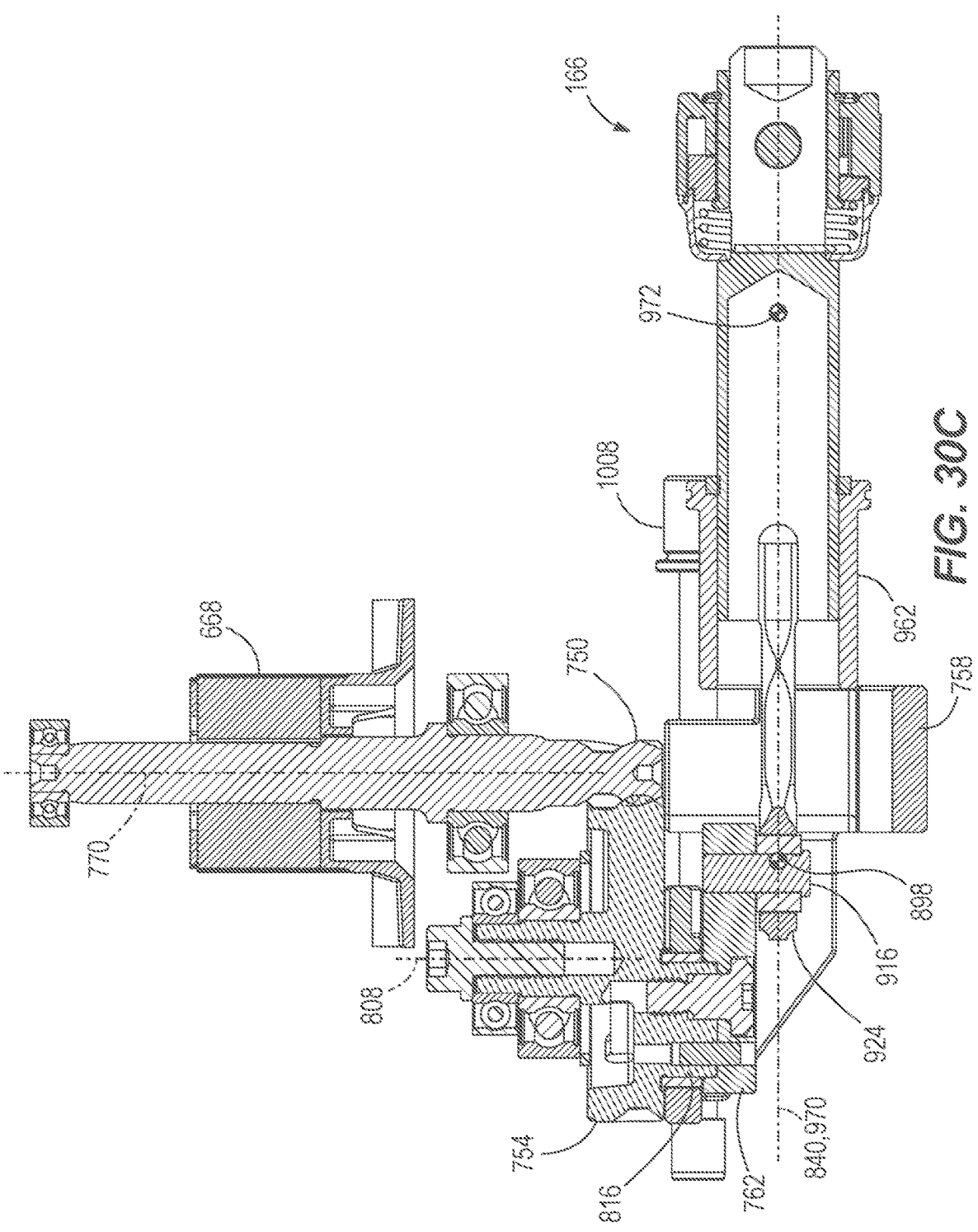
FIG. 30C illustrates a cross-sectional view of the reciprocating saw of FIG. 30A with the housing removed and taken along the line 30C-30C of FIG. 30B.

As shown in FIGS. 30B and 30C, the spindle assembly 766 extends generally through the counterweight 758. That is, the spindle assembly 766 is generally positioned between the first side 858 and the second side 862 of the counterweight 758 and between the third side 866 and the fourth side 870 of the counterweight 758. Accordingly, a portion of the counterweight 758 is above the spindle assembly 766 and a portion of the counterweight 758 is below the spindle assembly 766. The counterweight 758 also has portions on either side of the spindle assembly 766. As noted above, the center of gravity 898 of the counterweight 758 is preferably located within the height H of the spindle shaft 958. As shown in FIGS. 30B and 30C, the center of gravity 898 is located within both the first plane P1 and the second plane P2. In such case, the center of gravity 898 is located along the second reciprocation axis 970, and therefore, the first reciprocation axis 840 and the second reciprocation axis 970 are coincident with one another. In other embodiments, the center of gravity 898 of the counterweight 758 may be vertically offset from the first plane P1, as discussed above with respect to FIGS. 1A-28.

Figure 33:
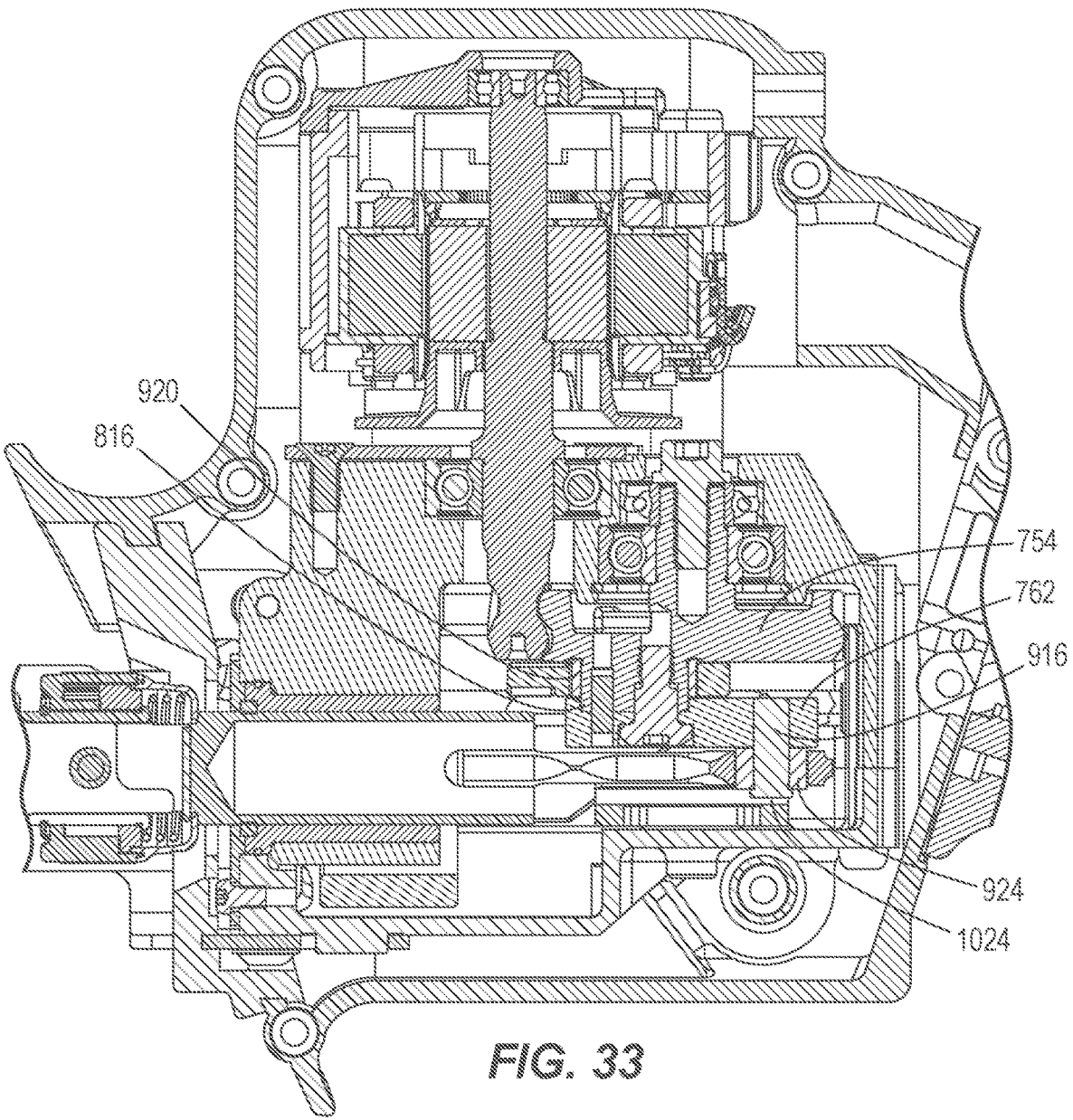
FIG. 33 is a cross-sectional view of another portion of the reciprocating saw taken along line 33-33 of FIG. 30A.
Figures 34, 35, 36:
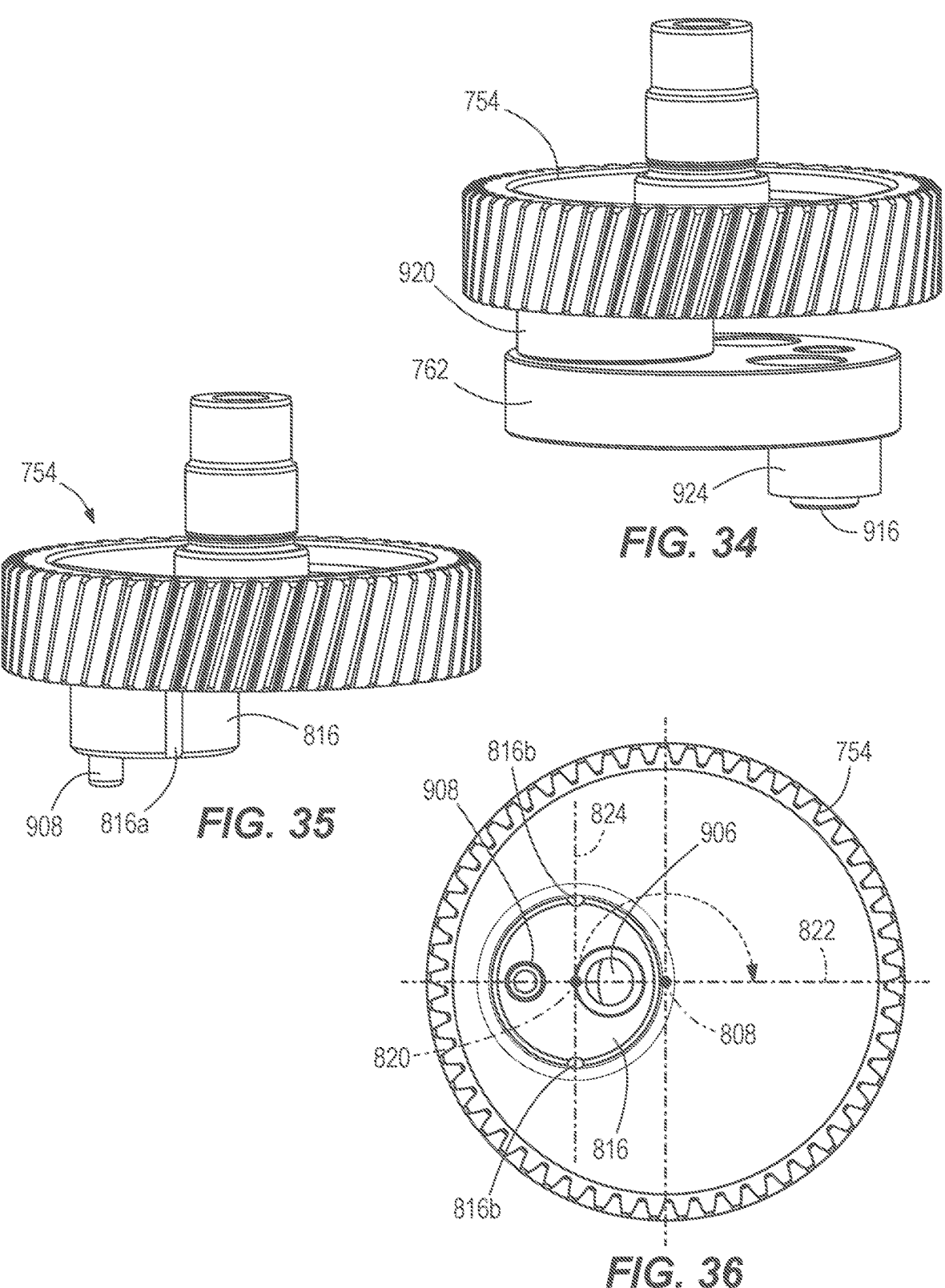
FIG. 34 is a side view of a portion of a transmission of FIG. 30A including an output gear, a first bearing, a crankshaft, and a second bearing.
FIG. 35 is a perspective view of the output gear of FIG. 30A.
FIG. 36 is a bottom view of the output gear of FIG. 30A.
Figures 37, 38, 39:
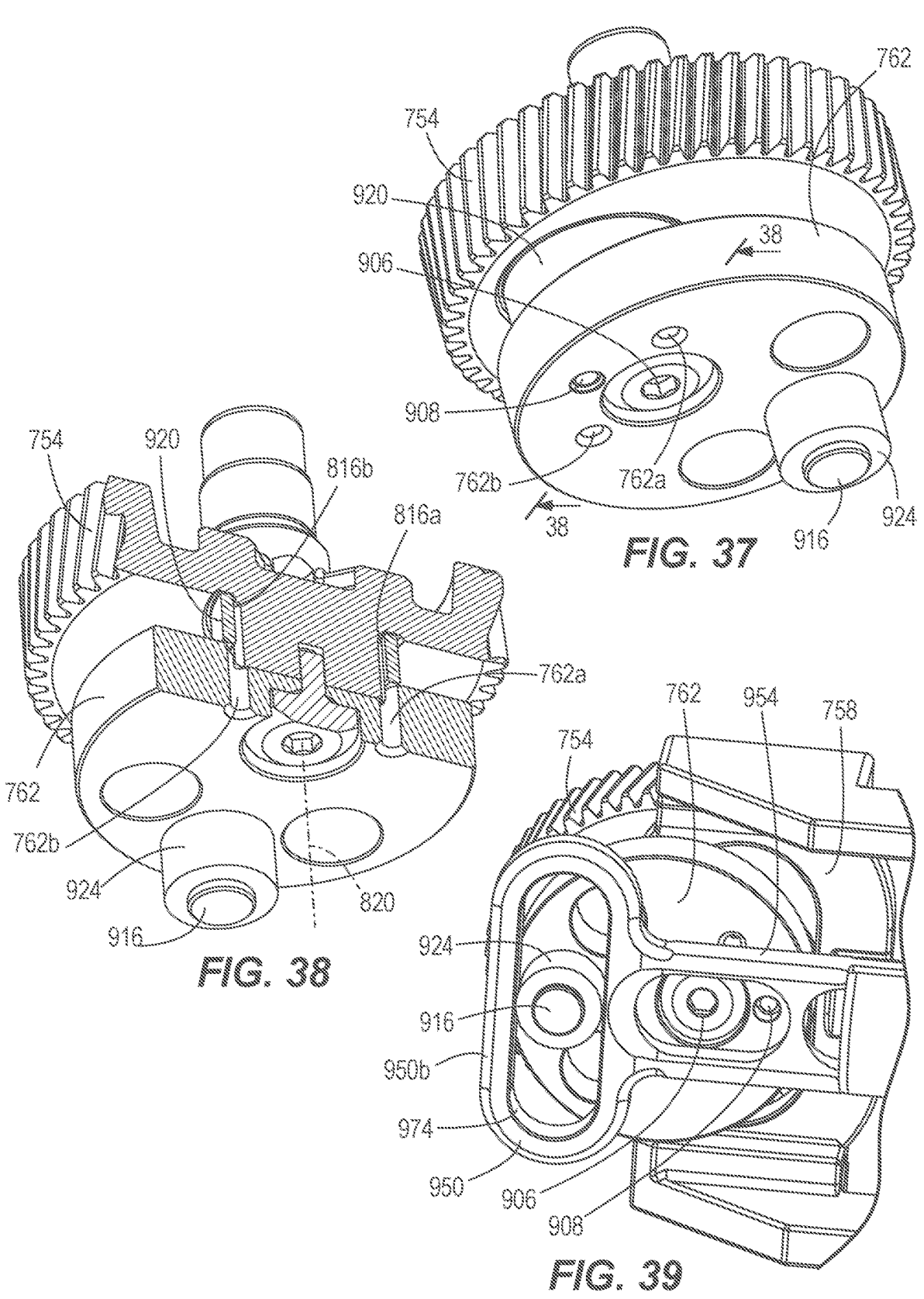
FIG. 37 is a perspective view of the portion of the transmission of FIG. 34.
FIG. 38 is a cross-sectional view of the portion of the transmission of FIG. 34 taken along the line 38-38 of FIG. 37.
FIG. 39 is a bottom view of the portion of the transmission of FIG. 34 and a portion of a spindle assembly and a counterweight.
Figure 40:
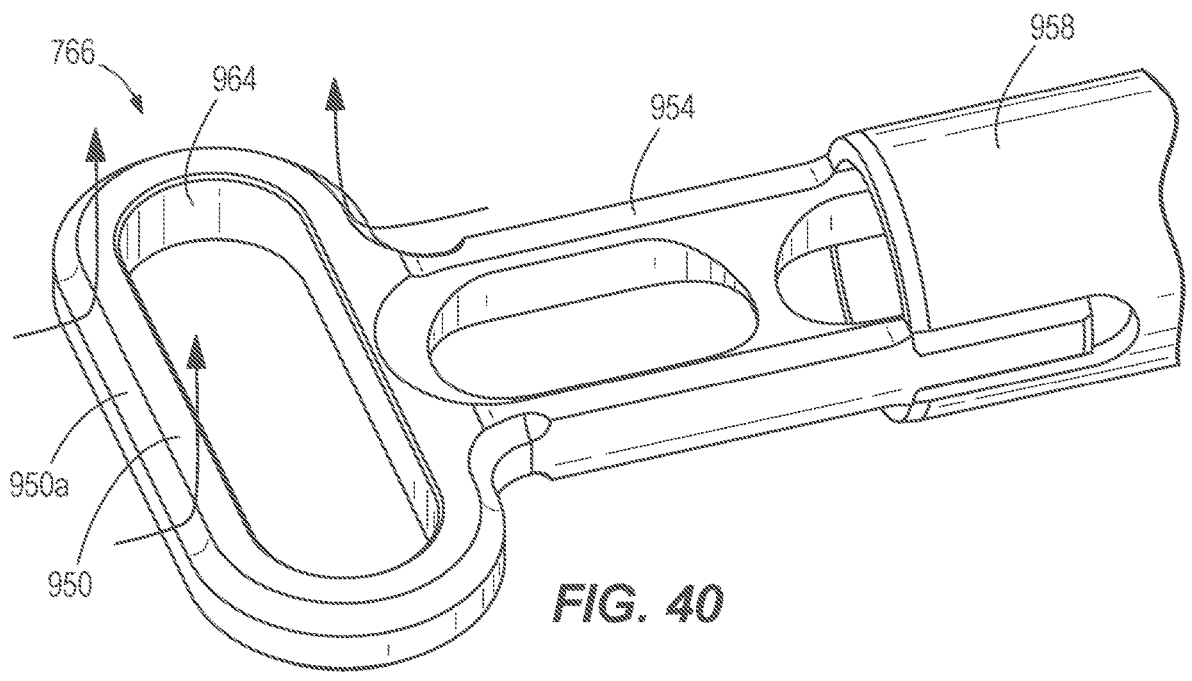
FIG. 40 is a perspective view of a portion of the spindle assembly of FIG. 39.

With reference to FIG. 33, similar to the saw 10, the saw 610 includes a crankshaft 762 that is coupled to the output gear 754. A first bearing 920 surrounds an eccentric shaft 816 that is positioned between the output gear 754 and the crankshaft 762. A second bearing 924 surrounds a second end of a second pin 916. The second pin 916 includes a retention shoulder 1024 disposed at the second end of the second pin 916. Therefore, the retention shoulder 1024, rather than the retention face 326 of the saw 10, inhibits the second bearing 924 from becoming uncoupled from the second pin 916. A gap is formed between the retention shoulder 1024 and the second bearing 924, allowing the second bearing 924 to move without becoming uncoupled from the second pin 916. The gap reduces unnecessary friction between the second bearing 924 and the retention shoulder 1024. Although not illustrated, it should be understood that the embodiments of FIGS. 1A-28 may include the retention shoulder 1024 of FIGS. 34-40.

As shown in FIGS. 34-40, the output gear 754 and the crankshaft 762 may be configured to guide grease contained within the gear case 672 along one or more grease passages to the eccentric shaft 816 and first bearing 920. In such case, an outer surface of the eccentric shaft 816 may include a first groove 816a and a second groove 816b. Each of the first groove 816a and the second groove 816b extend parallel to the eccentric axis 820. With respect to a bottom view of the output gear 754 in FIG. 39, the rotation axis 808 and the eccentric axis 820 both extend into and out of the page. A first axis 822 extends along a diameter of the output gear and intersects both the rotation axis 808 and the eccentric axis 820. As shown, the first groove 816a and the second groove 816b are on opposite sides of the eccentric axis 820 and on opposite sides of the first axis 822. Also, the first groove 816a and the second groove 816b are positioned on a second axis 824 that intersects both the eccentric axis 820 and the first axis 822. As shown, the first bearing 920 surrounds the first and second grooves 816a, 816b.

The crankshaft 762 includes a first aperture 762a and a second aperture 762b extending therethrough. The first aperture 762a and the second aperture 762b are each parallel to the rotation axis 808 and the eccentric axis 820. The first groove 816a is configured to align with the first aperture 762a and second groove 816b is configured to align with the second aperture 762b. Additionally, the second yoke 950 of the spindle assembly 766 includes scalloped or recessed surfaces 950a, 950b on opposite sides thereof.

In use, as the spindle assembly 766 reciprocates along the second reciprocation axis 970, grease is guided through crankshaft 762 to lubricate the surfaces of the eccentric shaft 816 and the first bearing 920. In particular, movement of the second yoke 950 causes grease to move through the apertures 762a, 762b in the crankshaft 762 to the grooves 816a, 816b. In other words, the aligned first aperture 762a and first groove 816a may be considered a first grease passage, while the aligned second aperture 762b and second groove

Figure 41:
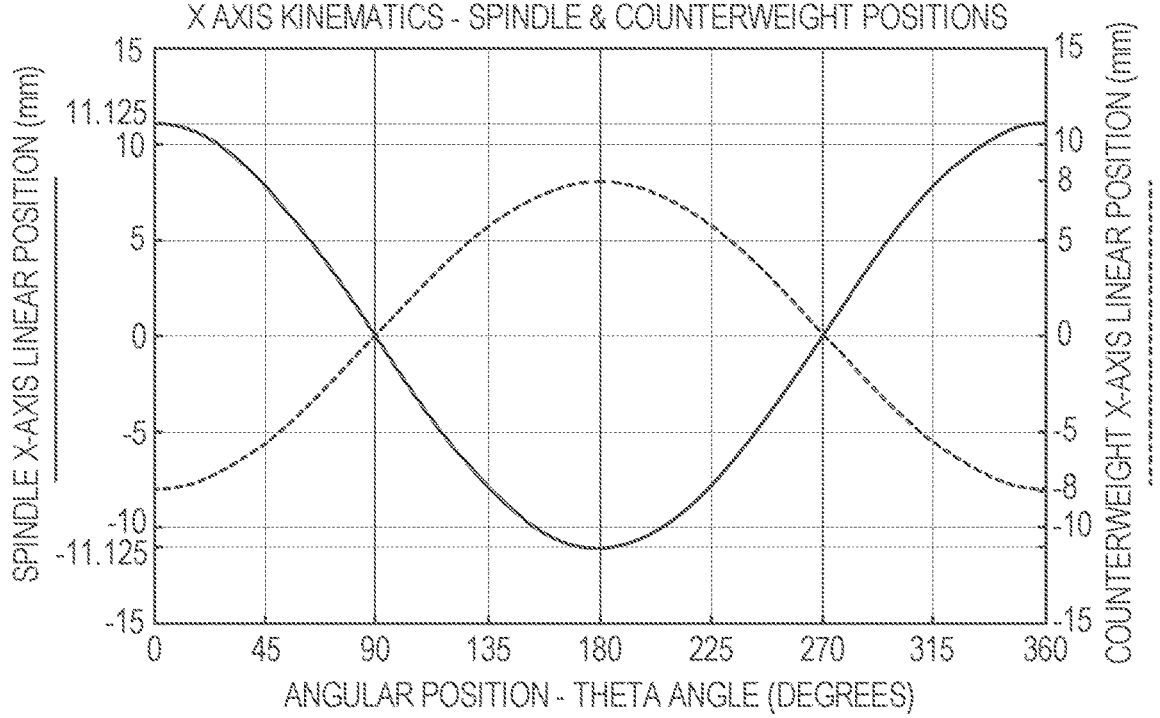
FIG. 41 illustrates the angular position relative to the linear positions of the spindle assembly and the counterweight during operation.
Figure 42:
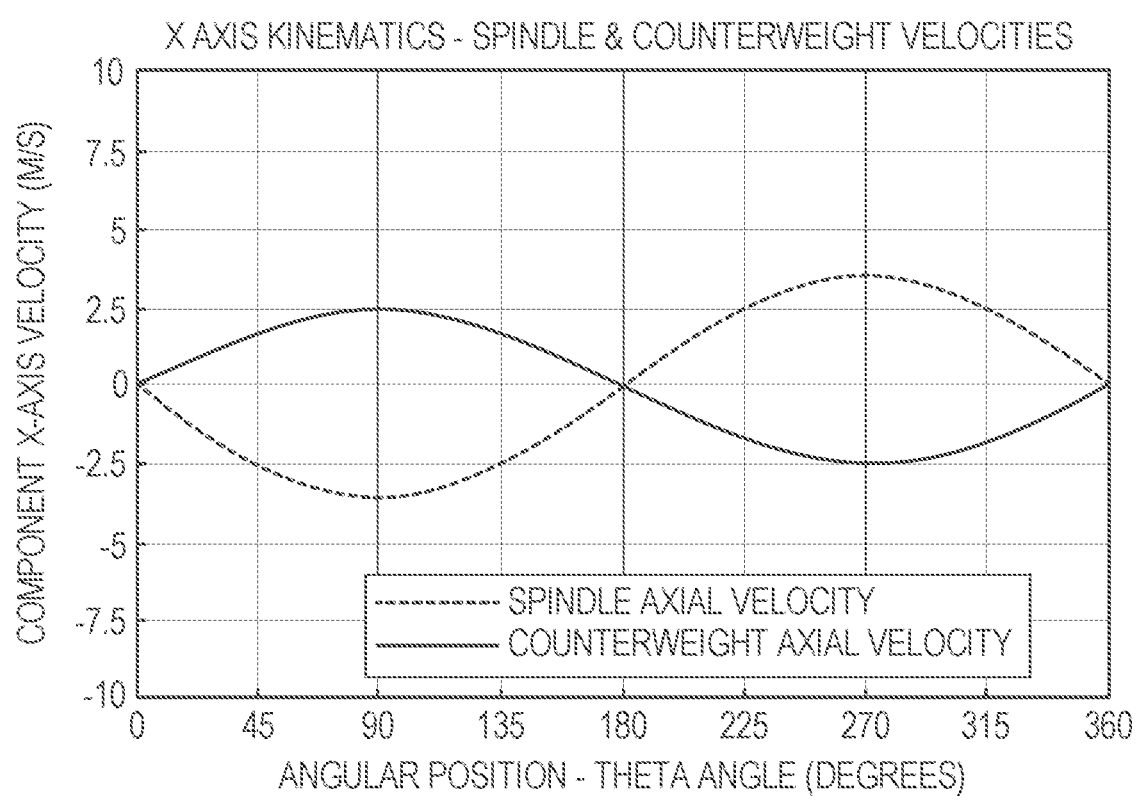
FIG. 42 illustrates the axial velocities of the spindle assembly and the counterweight during operation.
Figure 43:
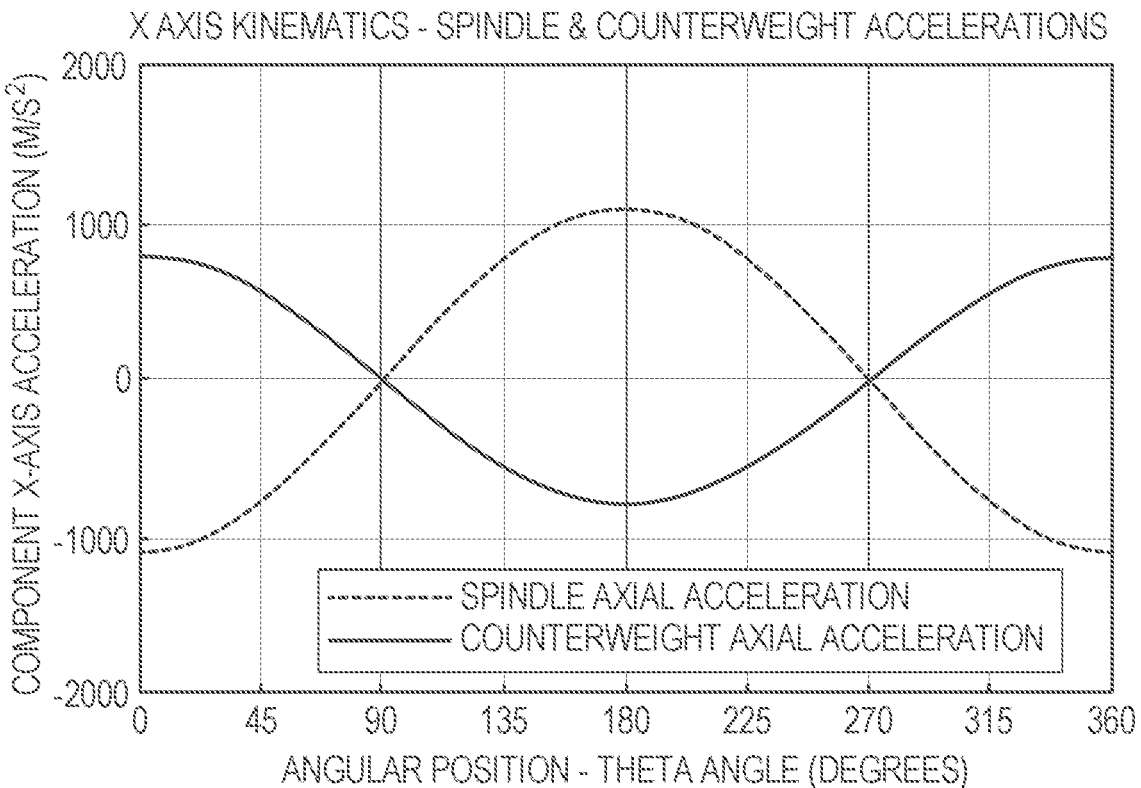
FIG. 43 illustrates the axial accelerations of the spindle assembly and the counterweight during operation.

816b may be considered a second grease passage. The first and second grease passages are configured to allow grease to flow therethrough to the lubricate the outer surface of the eccentric shaft 816 that is circumscribed by the first bearing 920. As shown in FIGS. 41-43, the grease passages are located at positions where the counterweight 758 has nominally no acceleration (e.g., no inertial force), such that the first bearing 920 experiences negligible contact forces where it is not supported from the eccentric shaft 816. The scalloped surfaces 950a, 950b of the second yoke 950 encourage the upward movement of grease towards the output gear 754 through the grease passages. In other embodiments, the grease passages (and therefore the aligned grooves 816a, 816b and apertures 762a, 762b thereof) may be located elsewhere. Additionally, while there are two grease passages in the illustrated embodiment, there may be a single grease passage or more than two grease passages in other embodiments. Regardless, the grease passages help to decrease friction, reduce wear, and improve the smoothness of operation. Although not illustrated, it should be understood that the embodiments of FIGS. 1A-28 may include the grease passages of FIGS. 34-40.

In some embodiments, the saw 10 further includes multiple modes that allow the user to change the output reciprocating speed of the tool element. The modes may allow the change in reciprocating speed by adjusting the motor speed or by adjusting the physical gearing. Moreover, the user may change between the modes via an actuator on the housing, a remote device, or an application on a smart phone or tablet computer.

Although the invention has been described in detail with reference to certain preferred embodiments, variations and modifications exist within the scope and spirit of one or more independent aspects of the invention as described.

Various features and advantages of the invention are set forth in the following claims.

What is claimed is:

1. A power tool comprising:
   a housing having a handle configured to be grasped by a user;
   a motor supported by the housing and defining a motor axis;
   a driving gear rotated by the motor about the motor axis;
   a driven gear defining a rotation axis that is parallel to the motor axis, the driven gear engaging the driving gear to be rotated by the driving gear about the rotation axis;
   a crankshaft coupled to and rotatable with the driven gear;
   a counterweight having a first yoke coupled to the driven gear to translate rotation of the driven gear into reciprocating motion of the counterweight; and
   a spindle having a second yoke coupled to the crankshaft to translate rotation of the driven gear into reciprocating motion of the spindle,
   wherein the counterweight and the spindle reciprocate opposite one another, and
   wherein the motor axis is positioned between the rotation axis and a distal end of the spindle that projects from the housing.

2. The power tool of claim 1, wherein a center of the crankshaft is coaxial with the rotation axis of the driven gear.

3. The power tool of claim 1, wherein the spindle and the counterweight translate 180 degrees out of phase with one another.

4. The power tool of claim 1, wherein the motor axis is perpendicular to a reciprocation axis of the spindle.

5. The power tool of claim 1, further comprising a gear case enclosing the driving gear, the driven gear, the crankshaft, the counterweight, and at least a portion of the spindle.

6. The power tool of claim 5, further comprising a fastener extending inwardly from the gear case, the fastener configured to be received in an elongated aperture of the counterweight to guide reciprocation of the counterweight.

7. The power tool of claim 1, wherein the spindle defines a reciprocation axis along which the spindle reciprocates, and wherein a center of gravity of the counterweight is positioned along the reciprocation axis.

8. The power tool of claim 1, wherein the spindle defines a reciprocation axis along which the spindle reciprocates, and wherein a center of gravity of the counterweight is vertically offset from the reciprocation axis and positioned within a height of the spindle.

9. The power tool of claim 1, further comprising a gear case enclosing the driving gear, the driven gear, the crankshaft, and the counterweight; and a fastener extending inwardly from the gear case, the fastener configured to be received in an elongated aperture of the counterweight to guide reciprocation of the counterweight.

10. The power tool of claim 1, further comprising a gear case enclosing the driving gear, the driven gear, the crankshaft, and the counterweight, wherein the counterweight is disposed on and movable along a first rail and a second rail within the gear case.

11. A power tool comprising:

a housing having a handle configured to be grasped by a user;

a motor supported by the housing;

a driving gear rotated by the motor;

a driven gear defining a rotation axis, the driven gear engaging the driving gear to be rotated by the driving gear about the rotation axis;

a crankshaft coupled to and rotatable with the driven gear;

a counterweight having a first yoke coupled to the driven gear to translate rotation of the driven gear into reciprocating motion of the counterweight, the counterweight defining a center of gravity; and a spindle having a second yoke coupled to the crankshaft to translate rotation of the driven gear into reciprocating motion of the spindle, wherein counterweight and the spindle reciprocate opposite one another, and wherein the center of gravity of the counterweight is positioned within a height of the spindle.

12. The power tool of claim 11, wherein the spindle defines a reciprocation axis along which the spindle reciprocates, and wherein the center of gravity of the counterweight is positioned along the reciprocation axis.

13. The power tool of claim 11, wherein the spindle defines a reciprocation axis along which the spindle reciprocates, and wherein the center of gravity of the counterweight is vertically offset from the reciprocation axis.

14. The power tool of claim 11, wherein a portion of the counterweight is above the spindle and a portion of the counterweight is below the spindle.

15. A power tool comprising:

a housing;

a motor supported by the housing;

a driving gear rotated by the motor;

a driven gear defining a rotation axis and including an eccentric shaft, the driven gear engaging the driving gear to be rotated by the driving gear about the rotation axis;

a bearing movably supported on the eccentric shaft;

a crankshaft coupled to eccentric shaft and rotatable with the driven gear;

a grease passage at least partially defined through the crankshaft;

a counterweight having a first yoke, the eccentric shaft extending through the first yoke such that rotation of the driven gear causes reciprocating motion of the counterweight, the bearing being positioned between eccentric shaft and the first yoke; and a spindle having a second yoke coupled to the crankshaft to translate rotation of the driven gear into reciprocating motion of the spindle, wherein the counterweight and the spindle reciprocate opposite one another, and wherein reciprocation of the spindle causes grease to move through the grease passage to lubricate the bearing.

16. The power tool of claim 15, wherein the grease passage is at least partially defined by an aperture extending through the crankshaft.

17. The power tool of claim 15, wherein the grease passage is defined by an aperture extending through the crankshaft and a groove in an outer surface of the eccentric shaft, the groove being aligned with the aperture.

18. The power tool of claim 15, wherein the second yoke includes a scalloped surface that guides the grease to the grease passage.

19. The power tool of claim 15, wherein the grease passage extends parallel to the rotation axis.

20. The power tool of claim 15, wherein the motor defines a motor axis, wherein the driving gear is rotated by the motor about the motor axis, and wherein the motor axis is parallel to the rotation axis.

21. A power tool comprising:

a housing having a handle configured to be grasped by a user;

a motor supported by the housing and defining a motor axis;

a driving gear rotated by the motor about the motor axis;

a driven gear defining a rotation axis that is parallel to the motor axis, the driven gear engaging the driving gear to be rotated by the driving gear about the rotation axis;

a crankshaft coupled to and rotatable with the driven gear;

a counterweight having a first yoke coupled to the driven gear to translate rotation of the driven gear into reciprocating motion of the counterweight; and a spindle having a second yoke coupled to the crankshaft to translate rotation of the driven gear into reciprocating motion of the spindle, wherein the counterweight and the spindle reciprocate opposite one another, wherein the spindle defines a reciprocation axis along which the spindle reciprocates, and wherein a center of gravity of the counterweight is positioned along the reciprocation axis.

22. A power tool comprising:

a housing having a handle configured to be grasped by a user;

a motor supported by the housing and defining a motor axis;

a driving gear rotated by the motor about the motor axis;

a driven gear defining a rotation axis that is parallel to the motor axis, the driven gear engaging the driving gear to be rotated by the driving gear about the rotation axis;

a crankshaft coupled to and rotatable with the driven gear;

a counterweight having a first yoke coupled to the driven gear to translate rotation of the driven gear into reciprocating motion of the counterweight; and a spindle having a second yoke coupled to the crankshaft to translate rotation of the driven gear into reciprocating motion of the spindle, wherein the counterweight and the spindle reciprocate opposite one another, wherein the spindle defines a reciprocation axis along which the spindle reciprocates, and wherein a center of gravity of the counterweight is vertically offset from the reciprocation axis and positioned within a height of the spindle.

23. A power tool comprising:

a housing having a handle configured to be grasped by a user;

a motor supported by the housing and defining a motor axis;

a driving gear rotated by the motor about the motor axis;

a driven gear defining a rotation axis that is parallel to the motor axis, the driven gear engaging the driving gear to be rotated by the driving gear about the rotation axis;

a crankshaft coupled to and rotatable with the driven gear;

a counterweight having a first yoke coupled to the driven gear to translate rotation of the driven gear into reciprocating motion of the counterweight;

a spindle having a second yoke coupled to the crankshaft to translate rotation of the driven gear into reciprocating motion of the spindle, a gear case enclosing the driving gear, the driven gear, the crankshaft, and the counterweight; and a fastener extending inwardly from the gear case, the fastener configured to be received in an elongated aperture of the counterweight to guide reciprocation of the counterweight, wherein the counterweight and the spindle reciprocate opposite one another.

* * * * *